(12) United States Patent
Wu

(10) Patent No.: US 9,450,356 B1
(45) Date of Patent: Sep. 20, 2016

(54) POWER OUTLET AND POWER OUTLET ASSEMBLY HAVING THE SAME

(71) Applicant: WELL SHIN TECHNOLOGY CO., LTD., Taipei (TW)

(72) Inventor: Jui-Hsiung Wu, Taipei (TW)

(73) Assignee: Well Shin Technology Co., Ltd., Taipei (TW)

( * ) Notice: Subject to any disclaimer, the term of this patent is extended or adjusted under 35 U.S.C. 154(b) by 0 days.

(21) Appl. No.: 14/988,843

(22) Filed: Jan. 6, 2016

(30) Foreign Application Priority Data

Sep. 22, 2015 (TW) .............................. 104215291 U

(51) Int. Cl.
*H01R 4/40* (2006.01)
*H01R 24/78* (2011.01)

(52) U.S. Cl.
CPC ..................... *H01R 24/78* (2013.01)

(58) Field of Classification Search
CPC .................................. H01R 4/30; H01R 4/38
USPC ................... 439/810–814, 106, 107
See application file for complete search history.

(56) References Cited

U.S. PATENT DOCUMENTS

| | | | | |
|---|---|---|---|---|
| 2,900,618 A * | 8/1959 | Geier | ...................... | H01R 4/36 439/812 |
| 3,775,733 A * | 11/1973 | Ege | ..................... | H01R 9/2491 439/712 |
| 4,006,323 A * | 2/1977 | Nelson | .................. | H01H 1/5855 200/284 |
| 4,634,211 A * | 1/1987 | Poliak | ...................... | H01R 4/44 439/106 |
| 4,674,807 A * | 6/1987 | Boteler | ................ | H01R 13/652 439/106 |
| 5,314,360 A * | 5/1994 | Jaag | ........................ | H01R 4/363 439/806 |
| 5,383,090 A * | 1/1995 | Freundner | ............ | H01R 4/5091 174/68.2 |
| 5,553,787 A * | 9/1996 | Guginsky | ............ | H01R 13/595 174/657 |
| 5,750,929 A * | 5/1998 | Romerein | .............. | H01R 24/52 174/88 C |
| 6,280,264 B1 * | 8/2001 | Whipple | ............ | H01H 11/0031 335/202 |
| 8,011,962 B2 * | 9/2011 | Pizzi | ...................... | H01R 4/363 439/607.41 |

* cited by examiner

*Primary Examiner* — Neil Abrams
(74) *Attorney, Agent, or Firm* — Fish & Richardson P.C.

(57) ABSTRACT

A power outlet for electrical connection with a plurality of electrical wires includes a plurality of limiting frames, a plurality of conductive terminals each having an abutment plate inserted into a respective limiting frame and spaced apart from a first side wall thereof for accommodating therebetween a core wire portion of the respective electrical wire, and a plurality of fasteners each being operable to extend through a second side wall of the respective limiting frame to push the abutment plate of a respective conductive terminal to move toward the first side wall of the respective limiting frame for tightly clamping the core wire portion of the respective electrical wire between the first side wall and the abutment plate.

20 Claims, 19 Drawing Sheets

POWER OUTLET AND POWER OUTLET ASSEMBLY HAVING THE SAME

CROSS-REFERENCE TO RELATED APPLICATION

This application claims priority of Taiwanese Application No. 104215291, filed on Sep. 22, 2015.

FIELD

The disclosure relates to a power outlet, and more particularly to a power outlet for electrical connection with a plurality of electrical wires and a power outlet assembly having the same.

BACKGROUND

An existing power outlet includes a plurality of conductive terminals and a plurality of adapter members respectively and electrically connected to the conductive terminals. Each adapter member has a receiving space and a threaded hole communicated with the receiving space. The receiving space is used for receiving a core wire portion of an electrical wire. By threadedly engaging a screw with the threaded hole of one of the adapter members until an end surface thereof abuts against the core wire portion of the electrical wire, the screw and the one of the adapter members can cooperatively clamp the core wire portion of the electrical wire therebetween.

Because a contact area between the end surface of the screw and the core wire portion of the electrical wire is limited such that the clamping force between the screw and the adapter member may not be uniform or sufficient, the core wire portion of the electrical wire is easily removed from the receiving space, thereby leading to hazard during use or causing bad connection between the core wire portion of the electrical wire and the adapter member to lead to unstable electrical conductivity. Further, during assembly, because the screw is usually screwed tightly to press against the core wire portion of the electrical wire, the core wire portion of the electrical wire is easily deformed or damaged.

On the other hand, the different existing power outlets have housings including plastic components that have different shapes and sizes. The plastic components of the power outlets cannot be interchangeably used. Thus, molds to cater to the different types of the plastic components of the power outlets must be manufactured, thereby increasing the producing and managing costs of the forming molds. Further, because there are many forming molds produced, each time a special type of power outlet is manufactured, time is consumed for installation of the forming molds and adjusting the parameters of plastic molding, so that not only time is consumed, the manufacturing cost is increased as well.

SUMMARY

Therefore, an object of the present disclosure is to provide a power outlet that includes an adapter member for stably and tightly clamping core wire portions of a plurality of electrical wires to prevent removal or bad connection of the core wire portions, thereby enhancing use safety, reliability and conductive stability thereof.

According to one aspect of the present disclosure, a power outlet for electrical connection with a plurality of electrical wires includes a housing and an adapter member. Each electrical wire has a core wire portion.

The housing has a receiving space, a plurality of insertion holes communicating with the receiving space, and a plurality of through holes communicating with the receiving space. Each of the through holes is configured for insertion of a respective one of the electrical wires therethrough. The adapter member includes an insulating body, a plurality of limiting frames, a plurality of conductive terminals and a plurality of fasteners. The insulating body is disposed in the receiving space. The limiting frames are disposed on the insulating body. Each limiting frame includes a first side wall, and a second side wall oppositely spaced apart from the first side wall. The conductive terminals are movably connected to the insulating body and respectively correspond with the insertion holes. Each conductive terminal includes an abutment plate inserted into a respective one of the limiting frames. The abutment plate of each conductive terminal and the first side wall of the respective one of the limiting frames are spaced apart from each other for accommodating therebetween the core wire portion of the respective one of the electrical wires. The fasteners are respectively and movably connected to the second side walls of the limiting frames. Each fastener is operable to extend through the second side wall of the respective one of the limiting frames to push the abutment plate of a respective one of the conductive terminals to move toward the first side wall of the respective one of the limiting frame for tightly clamping the core wire portion of the respective one of the electrical wires between the first side wall and the abutment plate.

Another object of the present disclosure is to provide a power outlet assembly that includes at least two different types of power outlets each including an adapter member for stably and tightly clamping core wire portions of a plurality of electrical wires to prevent removal or bad connection of the core wire portions, thereby enhancing use safety, reliability and conductive stability thereof.

Still another object of the present disclosure is to provide a power outlet assembly including different types of power outlets. The power outlets have plastic components identical in shapes and sizes. Through this, the manufacturing and management costs of the power outlet assembly can be saved, thereby reducing overall manufacturing cost of the assembly.

According to another aspect of the present disclosure, a power outlet assembly includes a mounting plate for mounting on a wall, and at least two power outlets mounted on the mounting plate. Each power outlet is configured to electrically connect with a plurality of electrical wires each having a core wire portion.

Each power outlet includes a housing and an adapter member. The housing has a receiving space, a plurality of insertion holes communicating with the receiving space, and a plurality of through holes communicating with the receiving space. Each through hole is configured for insertion of a respective one of the electrical wires therethrough. The adapter member includes an insulating body, a plurality of limiting frames disposed on the insulating body, a plurality of conductive terminals movably connected to the insulating body and respectively corresponding with the insertion holes, and a plurality of fasteners. Each limiting frame includes a first side wall, and a second side wall oppositely spaced apart from the first side wall. Each conductive terminal includes an abutment plate inserted into a respective one of the limiting frames. The abutment plate of each conductive terminal and the first side wall of the respective one of the limiting frames are spaced apart from each other for accommodating therebetween the core wire portion of the respective one of the electrical wires. The fasteners are respectively and movably connected to the second side walls of the limiting frames. Each fastener is operable to extend through the second side wall of a respective one of the limiting frames to push the abutment plate of a respective one of the conductive terminals to move toward the first side wall of the respective one of the limiting frames for tightly clamping the core wire portion of the respective one of the electrical wires between the first side wall and the abutment plate. The insulating bodies of the adapter members of the at least two different types of power outlets have identical shape and size.

The efficiency of this disclosure resides in that, through cooperation among each limiting frame, the abutment member of each conductive terminal, and each fastener to stably and tightly clamp the core wire portion of the respective electrical wire, removal or bad connection of the core wire portion of each electrical wire from or with the respective limiting frame can be prevented. Through this, the safety and reliability of the core wire portion of each electrical wire can be enhanced, and the conductive stability of the core wire portion of each electrical wire with the respective one of the limiting frame and the corresponding conductive terminal can be enhanced during use of the disclosure. Further, with the insulating bodies of the adapter members of the different types of power outlets having identical shape and size, the manufacturing and management costs of the power outlet assembly can be saved, thereby reducing overall manufacturing cost of the assembly.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
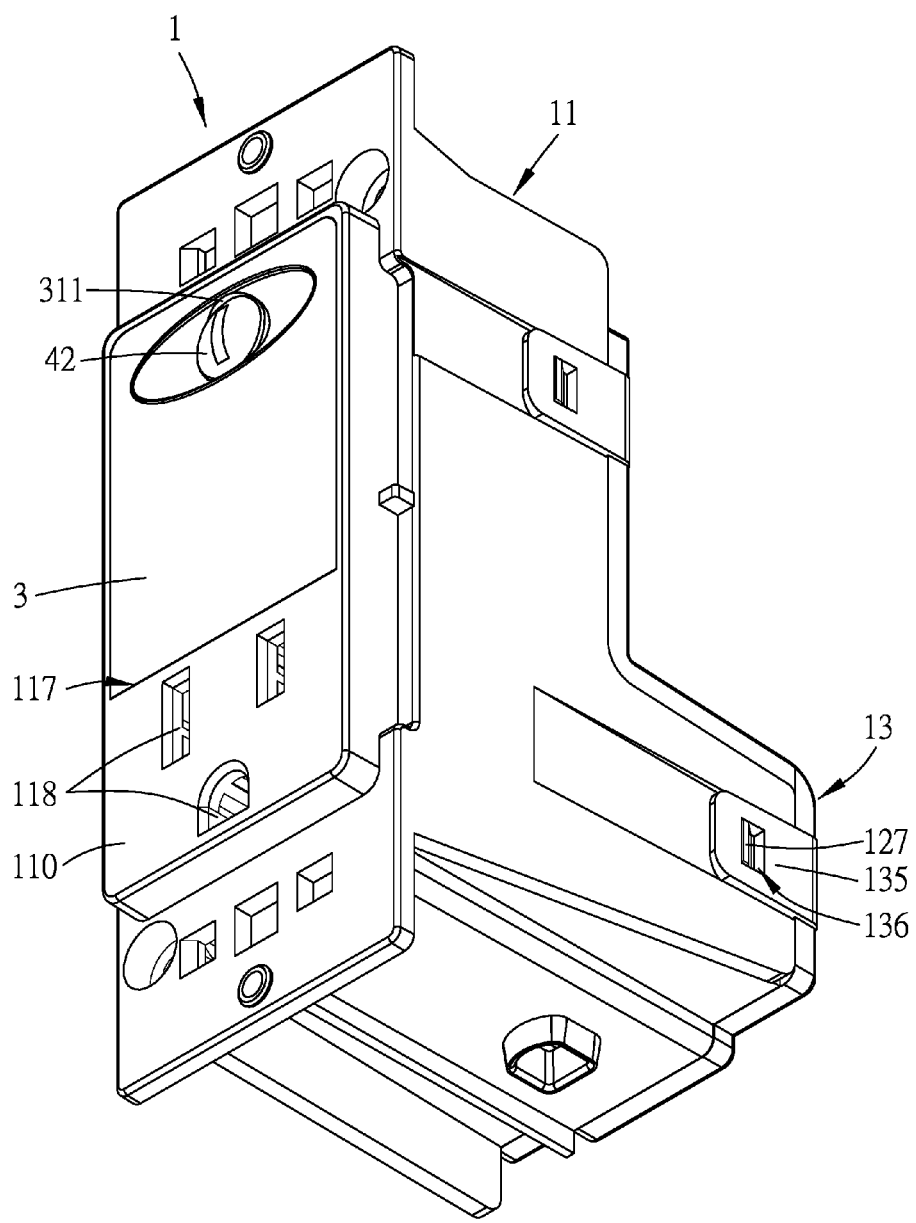
FIG. 1 is a perspective view of a power outlet according to a first embodiment of the present disclosure.

Before the present disclosure is described in greater detail, it should be noted that like elements are denoted by the same reference numerals throughout the disclosure.

Figure 2:
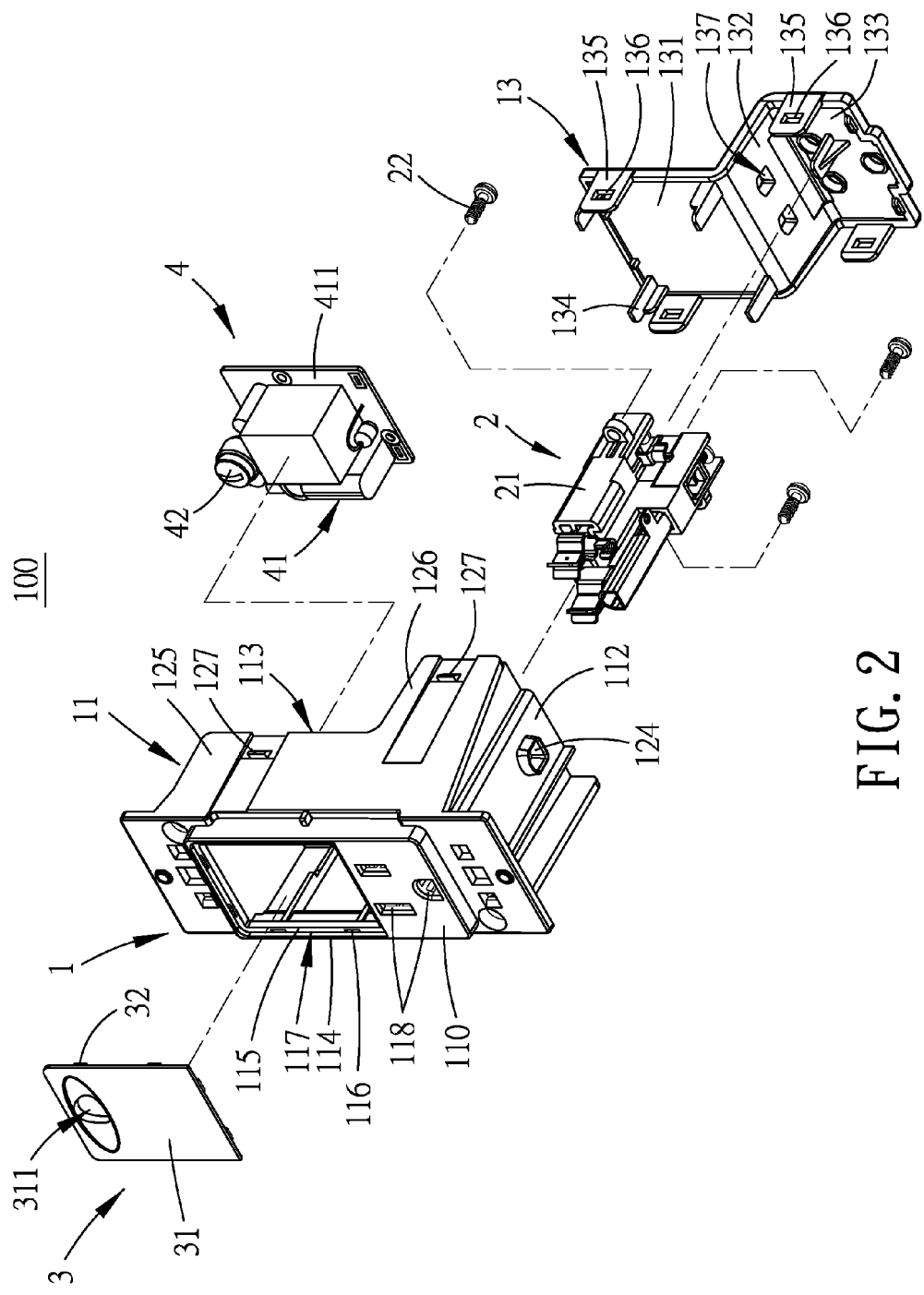
FIG. 2 is an exploded perspective view of the first embodiment, illustrating the assembly relationship among a housing, an adapter member, a panel and an electric component of the first embodiment.
Figure 6:
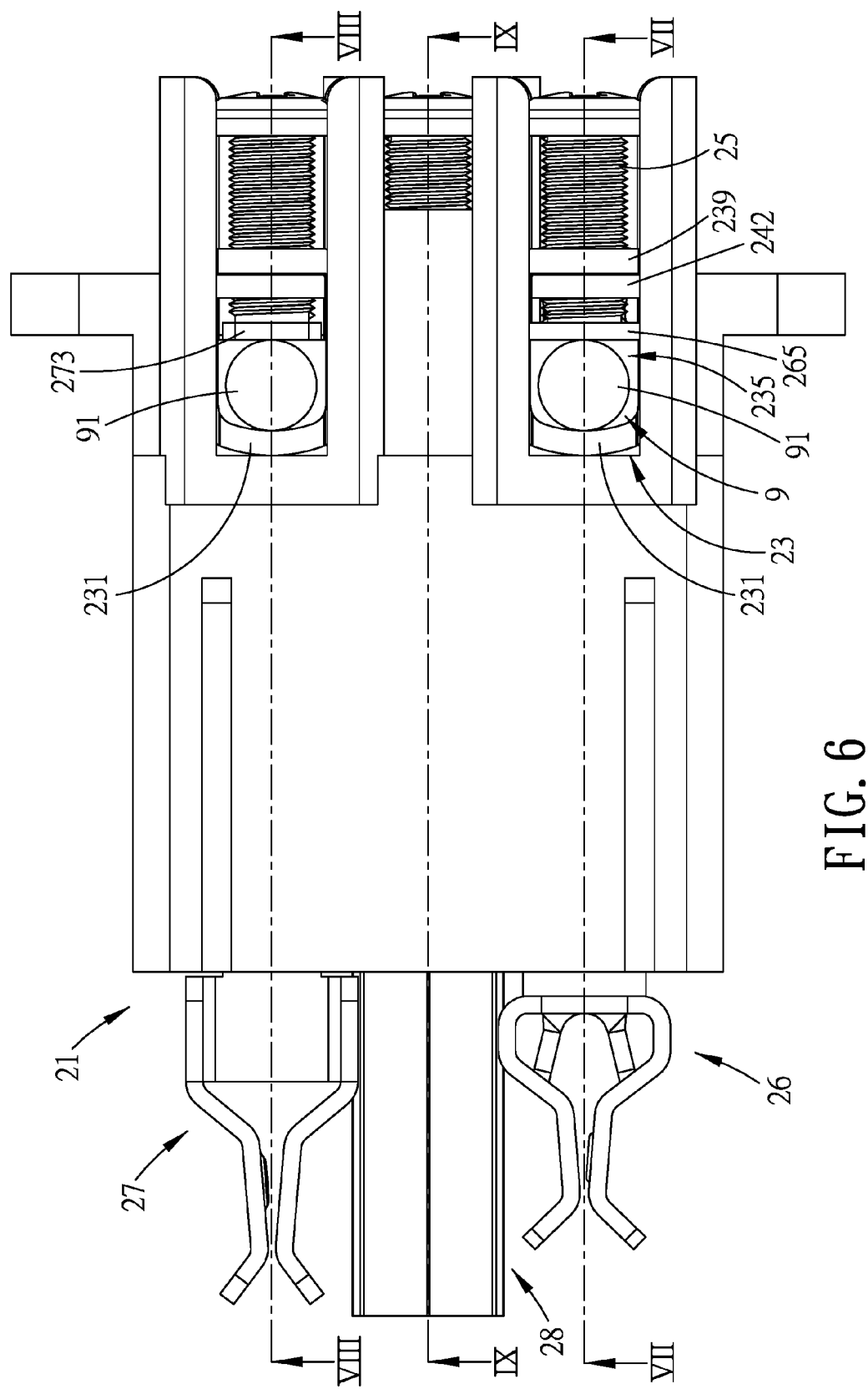
FIG. 6 is a schematic top view of the adapter member of the first embodiment.

Referring to FIGS. 1 and 2, a power outlet 100 according to a first embodiment of the present disclosure is configured as a US regulatory wall outlet for mounting on a wall (not shown) of a building and for electrical connection with a plurality of electrical wires 9 (see FIG. 6). The power outlet 100 includes a housing 1, an adapter member 2, a panel 3, and an electric component 4.

Figure 3:
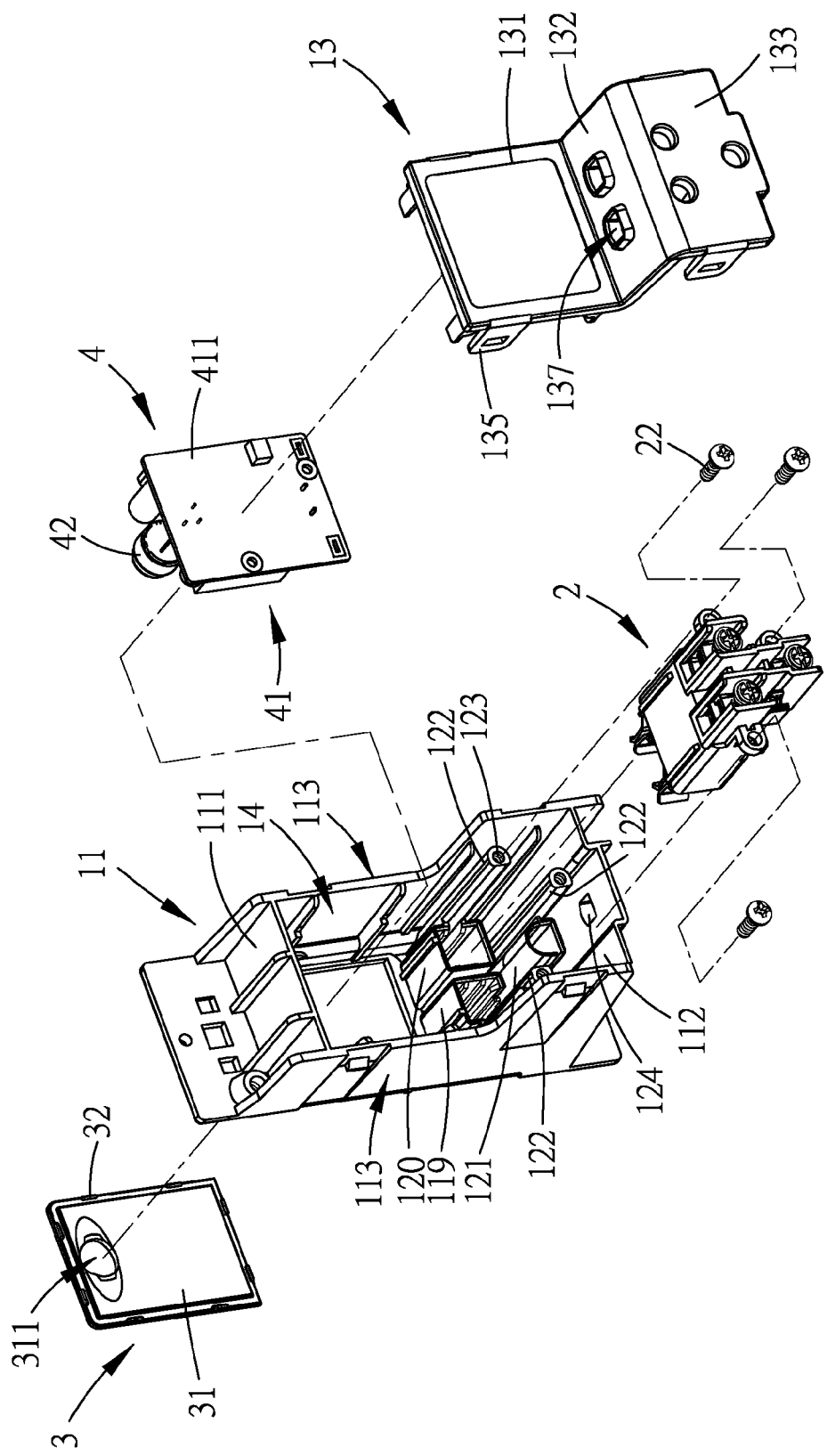
FIG. 3 is a view similar to FIG. 2, but taken from another angle.

Referring to FIG. 3, in combination with FIG. 2, the housing 1 is made of an insulating material, such as plastic, and includes a first housing body 11 and a second housing body 13 connected to a rear side of the first housing body 11. The first housing body 11 includes a front wall 110, a top wall 111 extending rearwardly and transversely from a top end portion of the front wall 110, a bottom wall 112 extending rearwardly and transversely from a bottom end portion of the front wall 110 opposite to the top wall 111, and two side walls 113 extending rearwardly and transversely from the front wall 110 between the top and bottom walls 111, 112 and spaced apart from each other in a left-right direction. The front wall 110 includes a rectangular annular wall portion 114 and an annular flange portion 115 projecting inwardly from an inner wall surface of the annular wall portion 114. An annular front end surface of the annular flange portion 115 is spaced a distance from an annular front end of the annular wall portion 114 to define therebetween an annular mounting groove 117. A plurality of spaced-apart locking slots 116 are formed in the front end surface of the annular flange 115. The front wall 110 is formed with a plurality of spaced-apart insertion holes 118 that is disposed below the mounting groove 117. The insertion holes 118 are provided for insertion of a plurality of prongs (not shown) of a plug therethrough.

The first housing body 11 further includes a first tubular sleeve 119, a second tubular sleeve 120, a third tubular sleeve 121 and a plurality of protruding bosses 122. The first to third tubular sleeves 119, 120, 121 project rearwardly from the rear side of the front wall 110 and respectively correspond in position to the insertion holes 118. The first and second tubular sleeves 119, 120 are spaced apart from each other in the left-right direction. The third tubular sleeve 121 is disposed below between the first and second tubular sleeves 119, 120. Each protruding boss 122 protrudes rearwardly from the rear side of the front wall 110 and is formed with a threaded hole 123.

The bottom wall 112 has a length greater than that of the top wall 111 in the rearward direction, and is formed with a through hole 124 for insertion of one of the electrical wires 9 therethrough. A left one of the side walls 113 is connected between left ends of the top and bottom walls 111, 112, and a right one of the side walls 113 is connected between right ends of the top and bottom walls 111, 112. In this embodiment, each side wall 113 has a substantially L-shaped form, and includes a first wall portion 125, a second wall portion 126 and two positioning hooks 127. The first wall portion 125 of each side wall 113 extends rearwardly from the rear side of the front wall 110 and is connected to a respective one of the left and right ends of the top wall 111. The second wall portion 126 of each side wall 113 extends rearwardly from the rear side of the front wall 110, and is connected to a bottom end of the first wall portion 125 and a respective one of the left and right ends of the bottom wall 112. The second wall portion 126 has a length greater than that of the first wall portion 125 in the rearward direction. The two positioning hooks 127 protrude respectively and laterally from outer wall surfaces of the first and second wall portions 125, 126 of each side wall 113.

The second housing body 13 includes a first rear wall 131, an extending wall 132 extending transversely and rearwardly from a bottom end of the first rear wall 131, a second rear wall 133 extending transversely and downwardly from a rear end of the extending wall 132, a plurality of spaced-apart supporting protrusions 134 protruding forwardly from a front surface of the first rear wall 131, and four engaging plates 135. In this embodiment, four supporting protrusions 134 respectively protrude forwardly from four corners of the first rear wall 131. Two of the engaging plates 135 are respectively connected to and extend forwardly from left and right ends of the first rear wall 131. The other two engaging plates 135 are respectively connected to and extend forwardly from left and right ends of the second rear wall 133. Each engaging plate 135 has an engaging hole 136 for engagement with a respective one of the positioning hooks 127. The extending wall 132 is formed with two through holes 137 that are spaced apart from each other in the left-right direction and that are provided for insertion of two of the electrical wires 9 respectively therethrough.

By virtue of the engagement between the engaging hole 136 of each engaging plate 135 and the respective positioning hook 127, the second housing body 13 can be firmly connected to the first housing body 11. The first and second housing bodies 11, 13 cooperatively define a receiving space 14.

Figure 4:
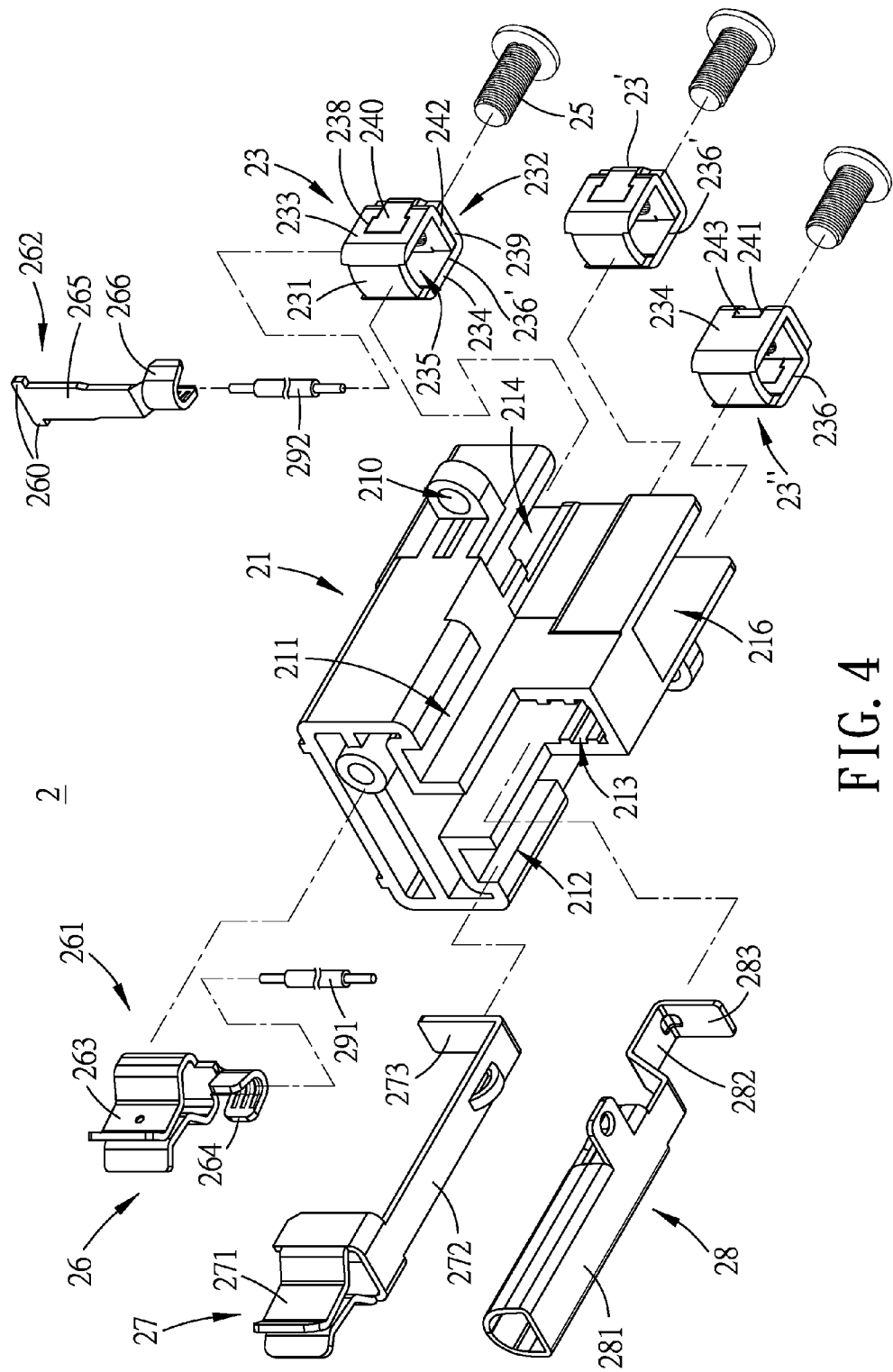
FIG. 4 is an exploded perspective view of the adapter member of the first embodiment.
Figure 5:
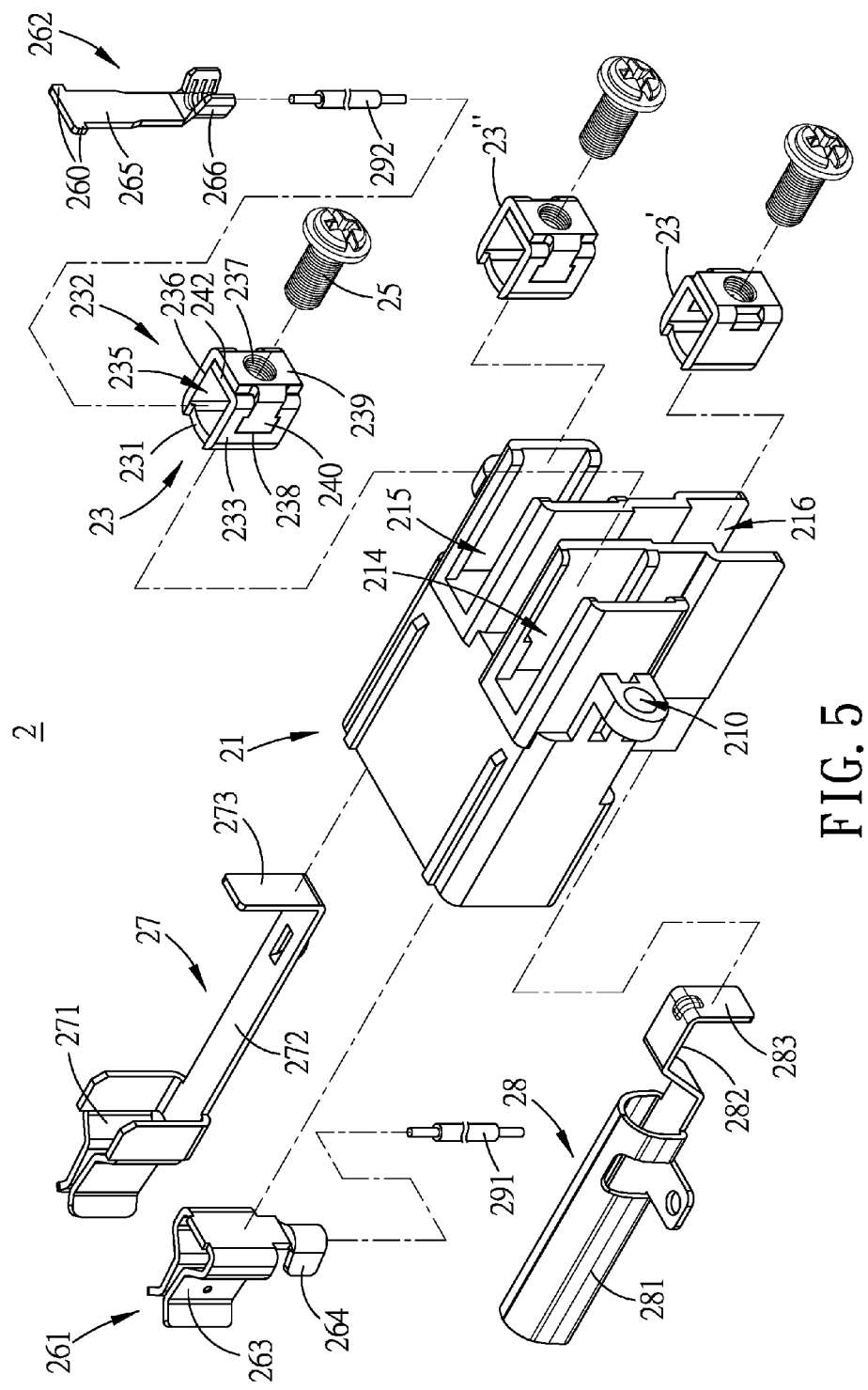
FIG. 5 is a view similar to FIG. 4, but taken from another angle.

Referring to FIGS. 4 and 5, in combination with FIG. 3, the adapter member 2 is received in the receiving space 14 in proximity to the bottom wall 112 and is disposed between the second wall portions 126 of the side walls 113. The adapter member 2 includes an insulating body 21, a plurality of screws 22, and a plurality of limiting frames 23. The insulating body 21 is made of an insulating material, such as plastic, is disposed in the receiving space 14, and is formed with a plurality of through bores 210 each corresponding in position to the threaded hole 123 of a respective one of the protruding bosses 122. By extending the screws through the respective through bores 210 and threadedly engaging the respective threaded holes 123 of the protruding bosses 122, the insulating body 21 can be firmly secured to the protruding bosses 122 of the first housing body 11. The insulating body 21 is further formed with a first guide groove 211, a second guide groove 212, a third guide groove 213, a first accommodating groove 214, a second accommodating groove 215, and a third accommodating groove 216. The first and second guide grooves 211, 212 are spaced apart from each other in the left-right direction, and are adjacent to a front end of the insulating body 21. Each of the first and second guide grooves 211, 212 is open at front, rear and bottom ends thereof. The third guide groove 213 is located in the middle of the insulating body 21 below between the first and second guide grooves 211, 212, and is open at front and rear ends thereof. The first to third accommodating grooves 214, 215, 216 are adjacent to a rear end of the insulating body 21. The first and second accommodating grooves 214, 215 are spaced apart from each other in the left-right direction. Each of the first and second accommodating grooves 214, 215 is open at top, bottom and rear ends thereof. The third accommodating groove 216 communicates with the third guide groove 213 at a rear end thereof, and is open at bottom and rear ends thereof.

The number of the limiting frames 23, 23' 23" is three in this embodiment. First and second ones of the limiting frames 23, 23' are respectively inserted into the first and second accommodating grooves 214, 215 through the rear ends thereof. A third one of the limiting frames 23" is inserted into the third accommodating groove 216 through the bottom end thereof. Each limiting frame 23, 23', 23" is formed into a frame configuration by stamping and bending a metal plate. Each limiting frame 23, 23', 23" includes a first side wall 231 located at a front end thereof, a second side wall 232 located at a rear end thereof and oppositely spaced apart from the first side wall 231, a third side wall 233 connecting one end of the first side wall 231 to one end of the second side wall 232, and a fourth side wall 234 connecting the other end of the first side wall 231 to the other end of the second side wall 232 and spaced apart from the third side wall 233. The first to fourth side walls 231, 232, 233, 234 cooperatively define an accommodating space 235 that has top and bottom openings 236, 236'. The top openings 236 of the first and second limiting frames 23, 23' accommodated in the respective first and second accommodating grooves 214, 215 respectively correspond in position to the through holes 137 of the second housing body 13. The third limiting frame 23" is inserted into the third accommodating groove 216 such that the top opening 236 thereof faces downward and corresponds in position to the through hole 124 of the first housing body 11. Through this, the core wire portion 91 (see FIG. 7) of each electrical wire 9 can be inserted into the accommodating space 235 of the respective limiting frame 23, 23', 23" through the top or bottom opening 236 or 236' thereof.

Because the structure of each of the limiting frames 23, 23', 23" is identical, the structure of one of the limiting frames 23, 23', 23" will be described hereinafter. Concretely speaking, the third side wall 233 of the limiting frame 23 is bent transversely and rearwardly from one end of the first side wall 213, and is formed with an engaging groove 238. The second side wall 232 includes an outer wall body 239 bent from an end of the fourth side wall 234 toward the third side wall 233 and formed with a first threaded hole 237, and an engaging arm 240 bent from an end of the outer wall body 239 opposite to the fourth side wall 234 and engaged with the engaging groove 238. Through this, the second side wall 232 and the third side wall 233 can be connected to each other to fix the frame configuration of the limiting frame 23.

Further, the fourth side wall 234 has an engaging groove 241 adjacent to the outer wall body 239 of the second side wall 232. The second side wall 232 further includes an inner wall body 242 bent from an end of the third side wall 233 toward the fourth side wall 234 and abutting against the outer wall body 239. The first threaded hole 237 extends through the inner and outer wall bodies 239, 242. The inner wall body 242 has an engaging tab 243 engaged with the engaging groove 241 of the fourth side wall 234. With the inner wall body 242 abutting against a front end of the outer wall body 239 and the engaging tab 243 thereof engaging with the engaging groove 241 of the fourth side wall 234, relative movement between the third side wall 233 and the engaging arm 240 of the second side wall 232 can be prevented and removal of the engaging arm 240 from the engaging groove 238 can also be prevented, so that the frame configuration of the limiting frame 23 can be more firmly fixed.

As shown in FIGS. 4 and 5, the adapter member 2 further includes a plurality of fasteners 25 and a plurality of conductive terminals. Three fasteners 25 are provided in this embodiment. Each fastener 25 is a screw threadedly connected to the first threaded hole 237 of the second side wall 232 of the respective limiting frame 23, 23', 23". By using a screwdriver (not shown), each fastener 25 can be driven threadedly and movably through the inner and outer wall bodies 239, 242 of the second side wall 232 of the respective limiting frame 23, 23', 23" via the first threaded hole 237 thereof.

Figure 7:
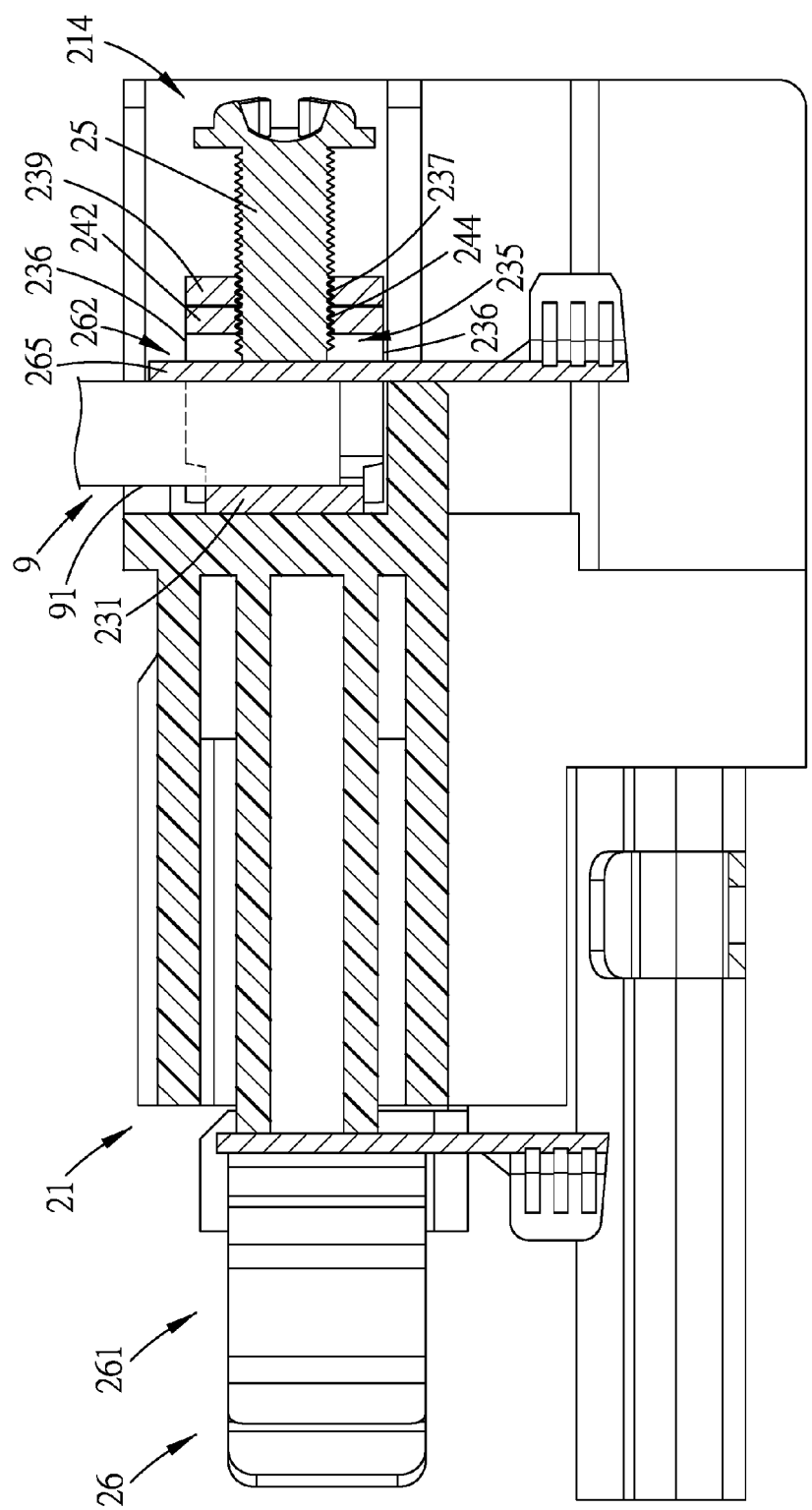
FIG. 7 is a sectional view of the first embodiment taken along line VII-VII of FIG. 6.

Referring FIGS. 6 and 7, in combination with FIGS. 4 and 5, the number of the conductive terminals provided in this embodiment is three: a first conductive terminal 26, a second conductive terminal 27 and a third conductive terminal 28. The first conductive terminal 26 is a hot line terminal that includes a first terminal part 261 and a second terminal part 262. The first terminal part 261 includes a terminal body 263 and a curved portion 264 connected to a bottom end of the terminal body 263 and opening toward the front wall 110. The terminal body 263 is inserted into the first tubular sleeve 119 (see FIG. 3), and has a rear end abutting against the front end of insulating body 21. The curved portion 264 is provided for welding one end of a conductive wire 291 thereto. The second terminal part 262 includes an abutment plate 265, and a curved portion 266 connected to a bottom end of the abutment plate 265 and opening toward the second housing body 13. The second terminal part 262 is inserted into the accommodating space 235 of the first limiting frame 23 through the top opening 236 thereof with two opposite projections 260 on top of the abutment plate 265 respectively abutting against top ends of the third and fourth side walls 233, 234. Through this, the abutment plate 265 is disposed in the accommodating space 235 such that a portion thereof extends out of the accommodating space 235 through the bottom opening 236'. The abutment plate 265 is movable in a front-rear direction relative to the first limiting frame 23, and has a rear surface for abutment with a front end of the fastener 25 that is connected to the first limiting frame 23. The curved portion 266 is exposed from the accommodating space 235 of the first limiting frame 23 and is provided for welding one end of a conductive wire 292 thereto.

The core wire portion 91 of one of the electrical wires 9 is inserted into the accommodating space 235 of the first limiting frame 23 through the top opening 236 thereof, and is disposed between the first side wall 231 and the abutment plate 265. To clamp the core wire portion 91, the fastener 25 connected to the first limiting frame 23 is rotatably driven to move into the accommodating space 235 of the first limiting frame 23 and push the abutment plate 265 to move toward the first side wall 231 so as to tightly clamp the core wire portion 91 between the first side wall 231 and the abutment plate 265.

Figure 8:
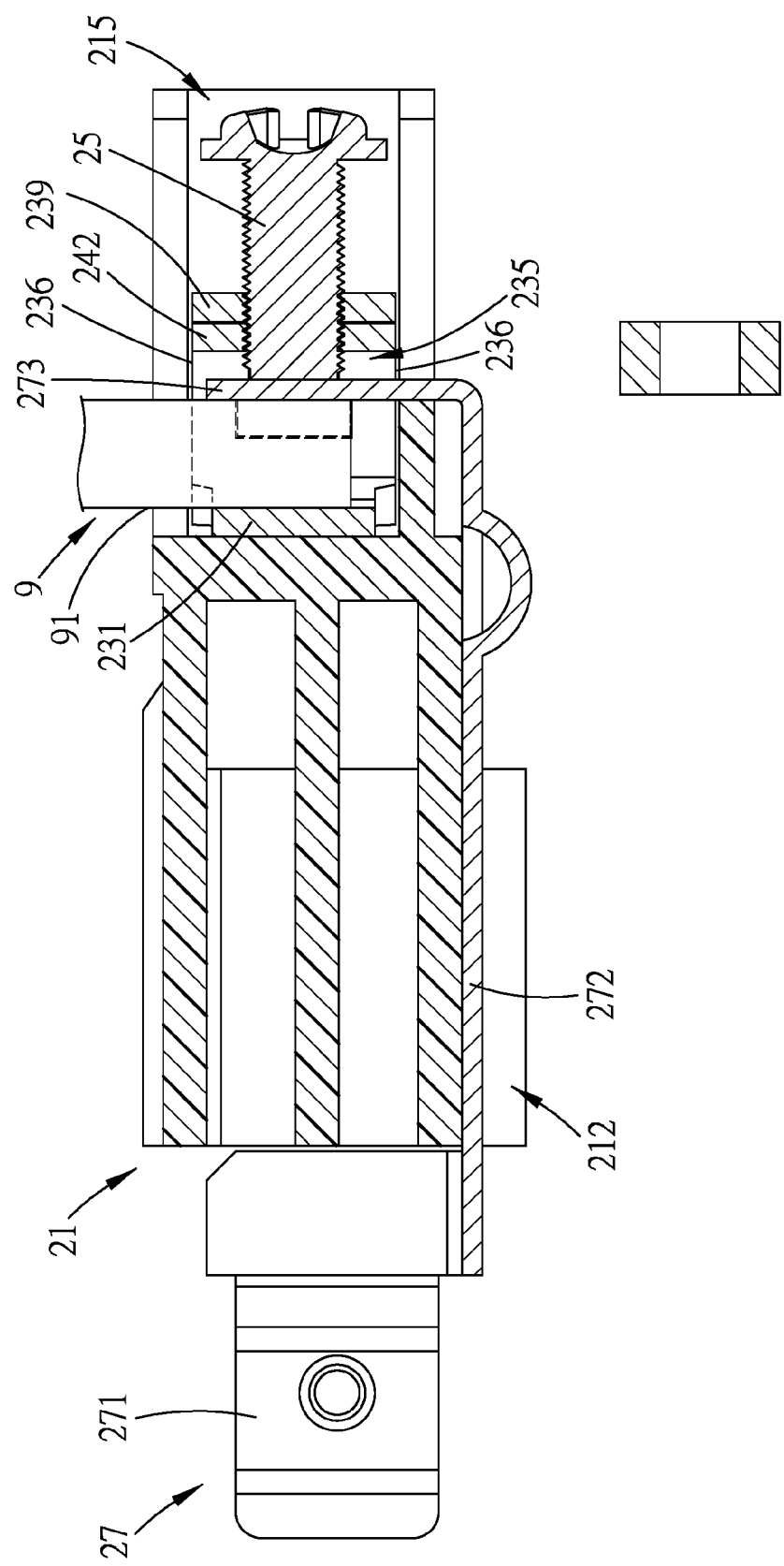
FIG. 8 is a sectional view of the first embodiment taken along line VIII-VIII of FIG. 6.

Referring to FIG. 8, in combination with FIGS. 4 to 6, the second conductive terminal 27 is a neutral terminal that includes a terminal body 271, an extension plate 272 extending rearwardly and transversely from a bottom end of the terminal body 271, and an abutment plate 273 extending upwardly from a rear end of the extension plate 272. The terminal body 271 is inserted into the second tubular sleeve 120 (see FIG. 3). The extension plate 272 is inserted into and is movable relative to the second guide groove 212 in the front-rear direction. The abutment plate 273 is inserted into the accommodating space 235 of the second limiting frame 23' through the bottom opening 236' thereof, and has a rear surface for abutment with a front end of the fastener 25 that is connected to the second limiting frame 23'. The core wire portion 91 of another electrical wire 9 is inserted into the accommodating space 235 of the second limiting frame 23' through the top opening 236 thereof, and is disposed between the first side wall 231 and the abutment plate 273. To clamp the core wire portion 91, the fastener 25 connected to the second limiting frame 23' is rotatably driven to move into the accommodating space 235 of the second limiting frame 23' and push the abutment plate 273 to move toward the first side wall 231 so as to tightly clamp the core wire portion 91 between the first side wall 231 and the abutment plate 273.

Figure 9:
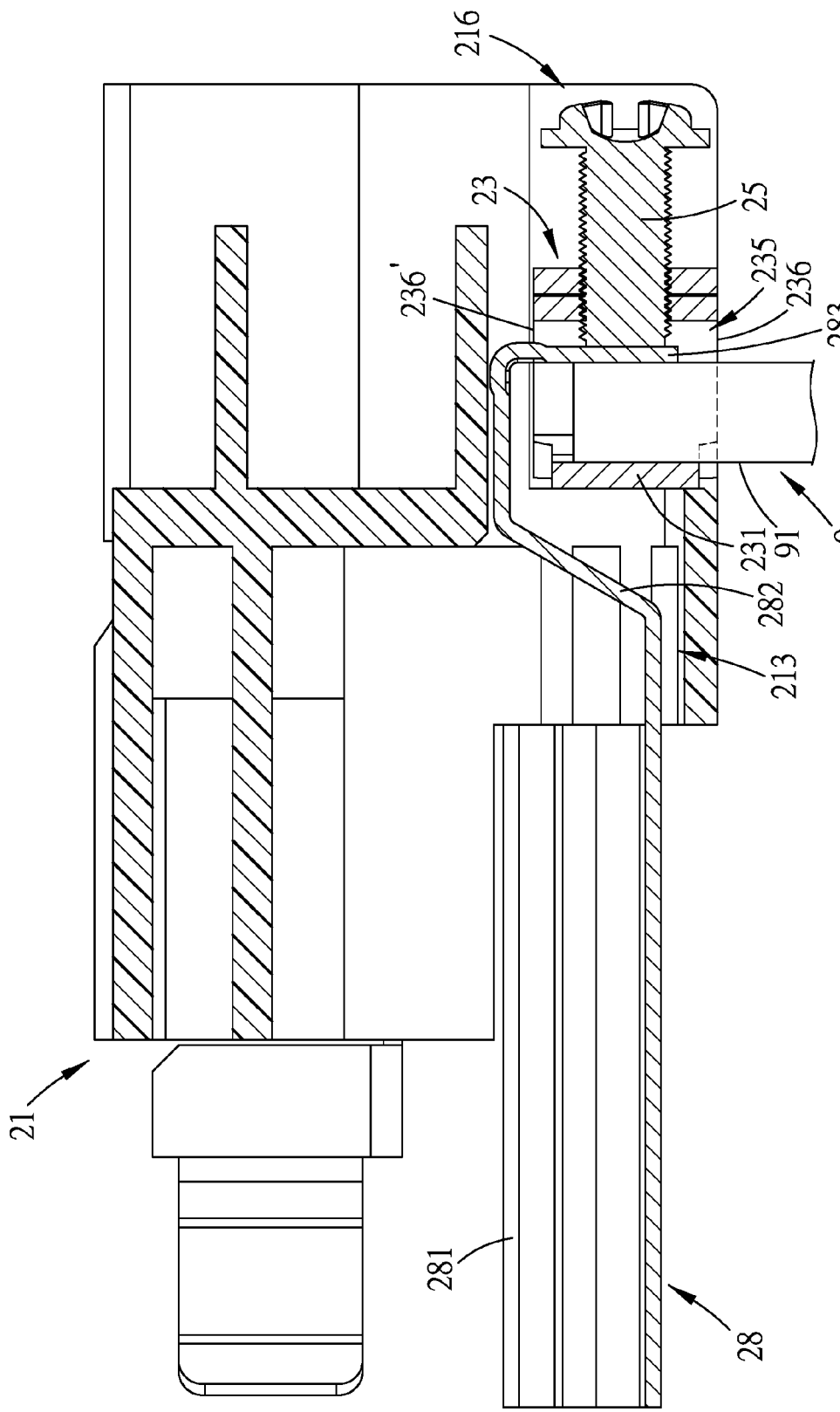
FIG. 9 is a sectional view of the first embodiment taken along line IX-IX of FIG. 6.

Referring to FIG. 9, in combination with FIGS. 4 to 6, the third conductive terminal 28 is a ground terminal that includes a terminal body 281, an extension plate 282 extending upwardly, inclinedly and then rearwardly from a rear end of the terminal body 281, and an abutment plate 283 extending downwardly from a rear end of the extension plate 282. The terminal body 281 is inserted into the third tubular sleeve 121 (see FIG. 3). The extension plate 282 is inserted into and is movable relative to the third guide groove 213 in the front-rear direction. The abutment plate 283 is inserted into the accommodating space 235 of the third limiting frame 23" through the bottom opening 236' thereof, and has a rear surface for abutment with a front end of the fastener 25 that is connected to the third limiting frame 23". The core wire portion 91 of a third one of the electrical wires 9 is inserted into the accommodating space 235 of the third limiting frame 23" through the top opening 236 thereof and is disposed between the first side wall 231 and the abutment plate 283. To clamp the core wire portion 91, the fastener 25 connected to the third limiting frame 23" is rotatably driven to move into the accommodating space 235 of the third limiting frame 23" and push the abutment plate 283 to move toward the first side wall 231 so as to tightly clamp the core wire portion 91 between the first side wall 231 and the abutment plate 283.

Referring back to FIGS. 7 to 9, by virtue of the limiting frames 23, 23', 23" respectively coordinating with the first to third abutment plates 265, 273, 283 of the first to third conductive terminals 26, 27, 28, each limiting frame 23, 23', 23" and the respective one of the first to third abutment plates 265, 273, 283 can increase contact with the core wire portion 91 of the respective electrical wire 9 and can surround and limit the same so as to fix the core wire portion 91 of the respective electrical wire 9 within the accommodating space 235 of the respective limiting frame 23, 23', 23". Further, with each fastener 25 abutting and pushing the respective one of the abutment plates 265, 273, 283 toward the first side wall 231 of the respective limiting frame 23, 23', 23", the first side wall 231 of each limiting frame 23, 23', 23" and the respective one of the abutment plates 265, 273, 283 can stably and tightly clamp therebetween the core wire portion 91 of the respective electrical wire 9 to prevent removal or bad connection of the core wire portion 91 from or with the respective limiting frame 23, 23', 23". Through this, the safety and reliability of the core wire portion 91 of each electrical wire 9 can be enhanced during use of the disclosure, and the conductive stability of the core wire portion 91 of each electrical wire 9 with the respective one of the limiting frames 23, 23', 23" and the corresponding abutment plate 265, 273, 283 can also be enhanced.

Referring back to FIGS. 2 and 3, the panel 3 is made, for example, from a plastic material, and includes a panel body 31 disposed in the mounting groove 117, and plurality of spaced-apart engaging tabs 32 extending rearwardly from a rear peripheral surface of the panel body 31. The panel body 31 is formed with an opening 311. The engaging tabs 32 are provided for respectively engaging the locking slots 116 in the first housing body 11. To mount the panel 3 on the first housing body 11, the panel body 31 is first disposed in the mounting groove 117 such that the panel body 31 abuts against the annular front end of the flange portion 115, after which the engaging tabs 32 are engaged with the respective locking slots 116, so that the panel 3 can be firmly connected to the first housing body 11.

The electric component 4 of this embodiment is an electronic switch disposed in the receiving space 14 of the housing 1 and located above the adapter member 2. The panel 3 corresponds in position to the electric component 4. The electric component 4 is located between the first wall portions 125 of the side walls 113, and has a length smaller than that of the adapter member 2 in the front-rear direction. The electric component 4 includes a circuit module 41 and a pyroelectric passive infrared (PIR) sensor 42. The circuit module 41 has a circuit board 411 clamped by the first housing body 11 and the supporting protrusions 134 of the second housing body 13. The circuit board 411 abuts against a top end of the insulating body 21. The PIR sensor 42 is electrically connected to the circuit board 411, and extends into the opening 311 in the panel 3. The PIR sensor 42 is exposed from the panel body 31 via the opening 311 for detecting a specific wavelength of infrared rays emitted from a human body as he/she approaches the power outlet 100 of the disclosure, thereby generating a detection signal.

The other end of the conductive wire 291 is electrically connected to a current output portion (not shown) of the circuit board 411. The other end of the conductive wire 292 is electrically connected to a current input portion (not shown) of the circuit board 411. When the PIR sensor 42 does not detect a person approaching the power outlet 100, the circuit module 41 is in an OFF State. At this time, the electric component 4 is in the OFF state, and a current input from the conductive wire 292 cannot be transmitted to the first terminal part 261 of the first conductive terminal 26 through the circuit module 41 and the conductive wire 291. When the PIR sensor 42 detects a person approaching the power outlet 100, it will generate a detection signal which is then transmitted to the circuit module 41 so as to switch the circuit module 41 from the OFF state to an ON state. The electric component 4 is in an ON state at this time, and the current input from the conductive wire 292 can be transmitted to the first terminal part 261 of the first conductive terminal 26 through the circuit module 41 and the conductive wire 291. Through the configuration of the electric component 4, the safe use of the power outlet 100 of the disclosure can be enhanced.

Figure 10:
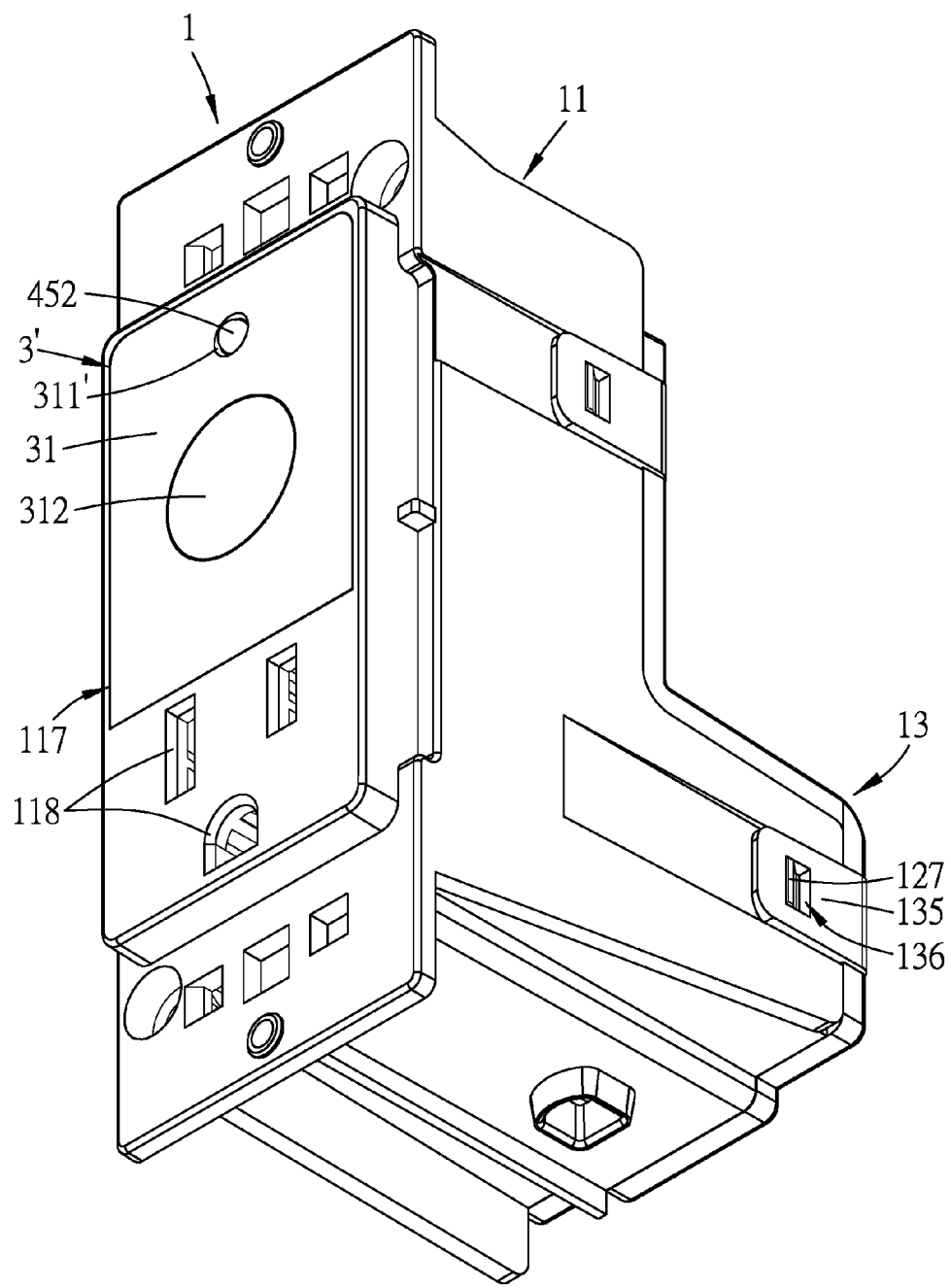
FIG. 10 is a perspective view of a power outlet according to a second embodiment of the present disclosure.
Figure 11:
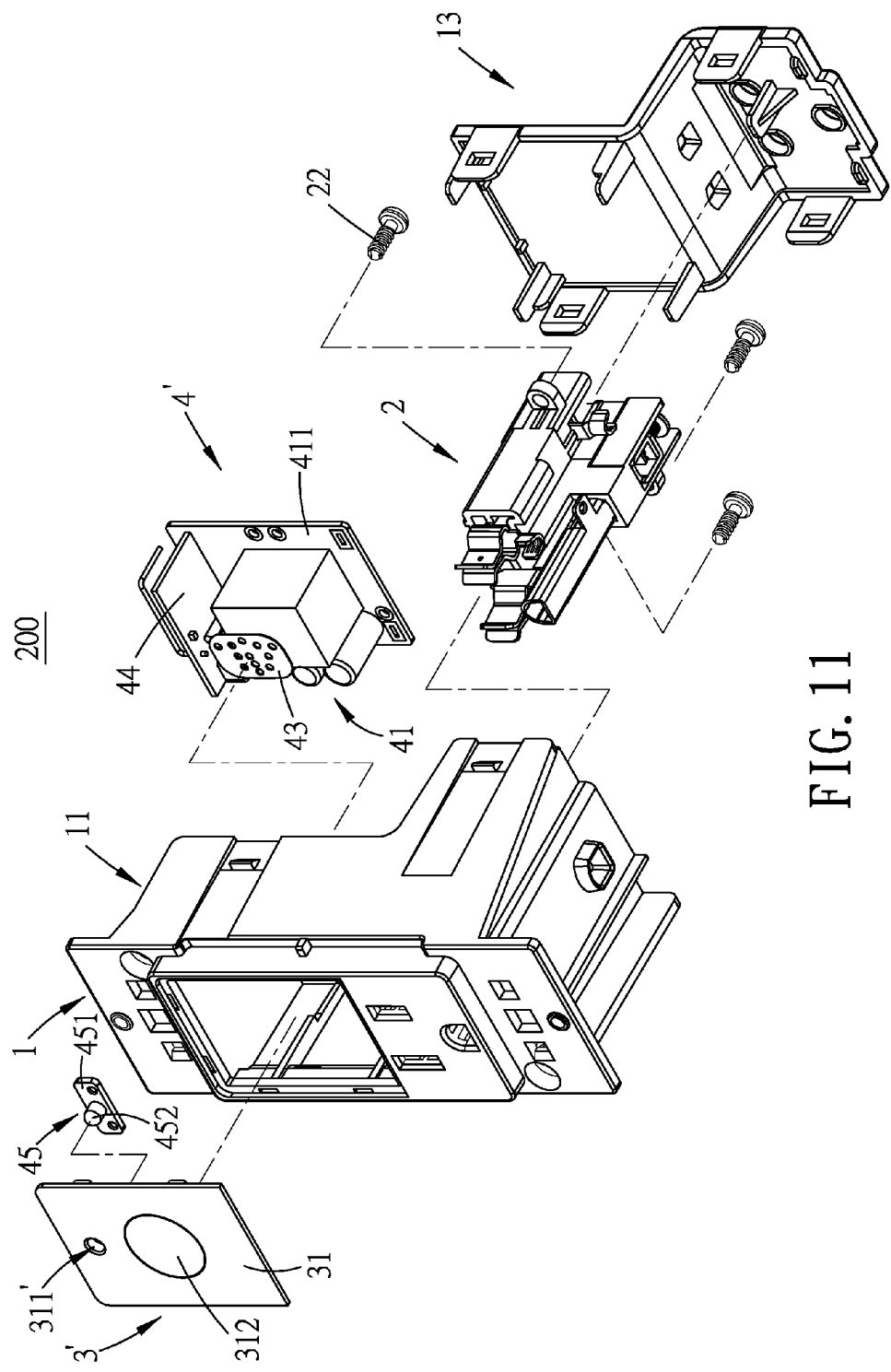
FIG. 11 is an exploded perspective view of the second embodiment.

FIGS. 10 and 11 illustrate a power outlet 200 according to a second embodiment of the present disclosure, which has a structure generally similar to that of the first embodiment. However, the difference between the first and second embodiments resides in the structures of the panel 3' and the electric component 4'.

In this embodiment, the panel body 31 of the panel 3' is further formed with a touch region 312, and the opening 311' thereof is smaller than that of the first embodiment. The touch region 312 is spaced apart from and disposed below the opening 311'. The electric component 4' includes the circuit module 41, a touch sensing module 43, a wireless communication module 44, and a light guide member 45. The touch sensing module 43 is electrically connected to the circuit module 41, and corresponds in position to the touch region 312. A user can use his/her finger to touch the touch region 312, so that the touch sensing module 43 can generate a control signal to switch the circuit module 41 between OFF and ON states. The wireless communication module 44 uses, for example, a Wi-Fi communication technology, so that wireless signals can be transmitted between the wireless communication module 44 and a mobile communication device of, for example, a tablet computer. The user can use the mobile communication device to transmit a wireless control signal to the wireless communication module 44. The wireless communication module 44 receives the control signal to switch the circuit module 41 between the OFF and ON states. The light guide member 45 is made of a photoconductive material, and has a connection plate 451 and a light guide pillar 452. The connection plate 451 is connected to a rear end surface of the panel body 31 of the panel 3'. The light guide pillar 452 protrudes forwardly from the connection plate 451 and extends into the opening 311' to correspond in position to a light indicator (not shown) of the circuit module 41. When the circuit module 41 is in the ON state, the light indicator will light up, and the light guide pillar 452 will guide the light emitted from the light indicator out of the panel 3'. Through this, the user can determine whether the electric component 4' is in the ON or OFF state.

Figure 12:
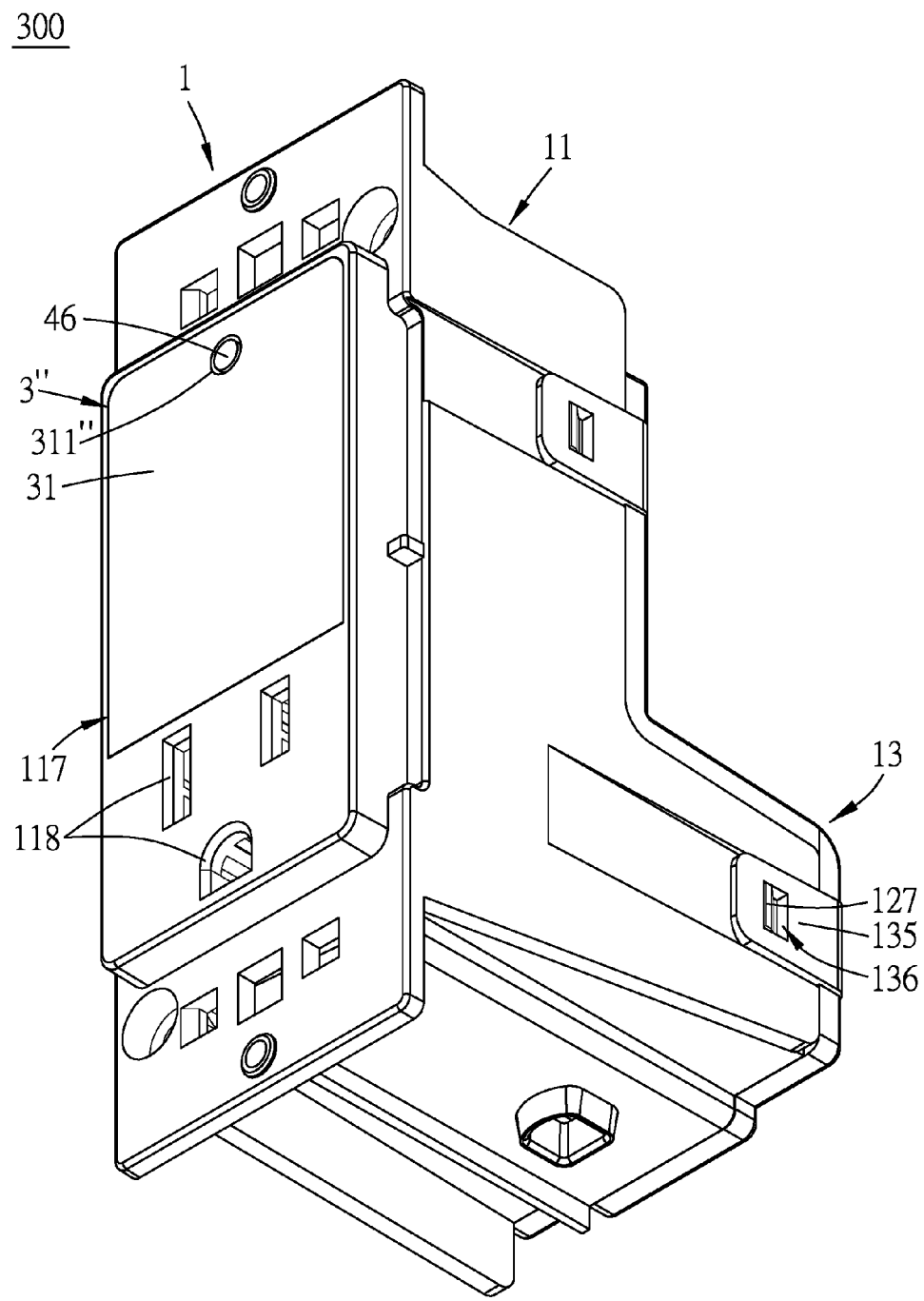
FIG. 12 is a perspective view of a power outlet according to a third embodiment of the present disclosure.
Figure 13:
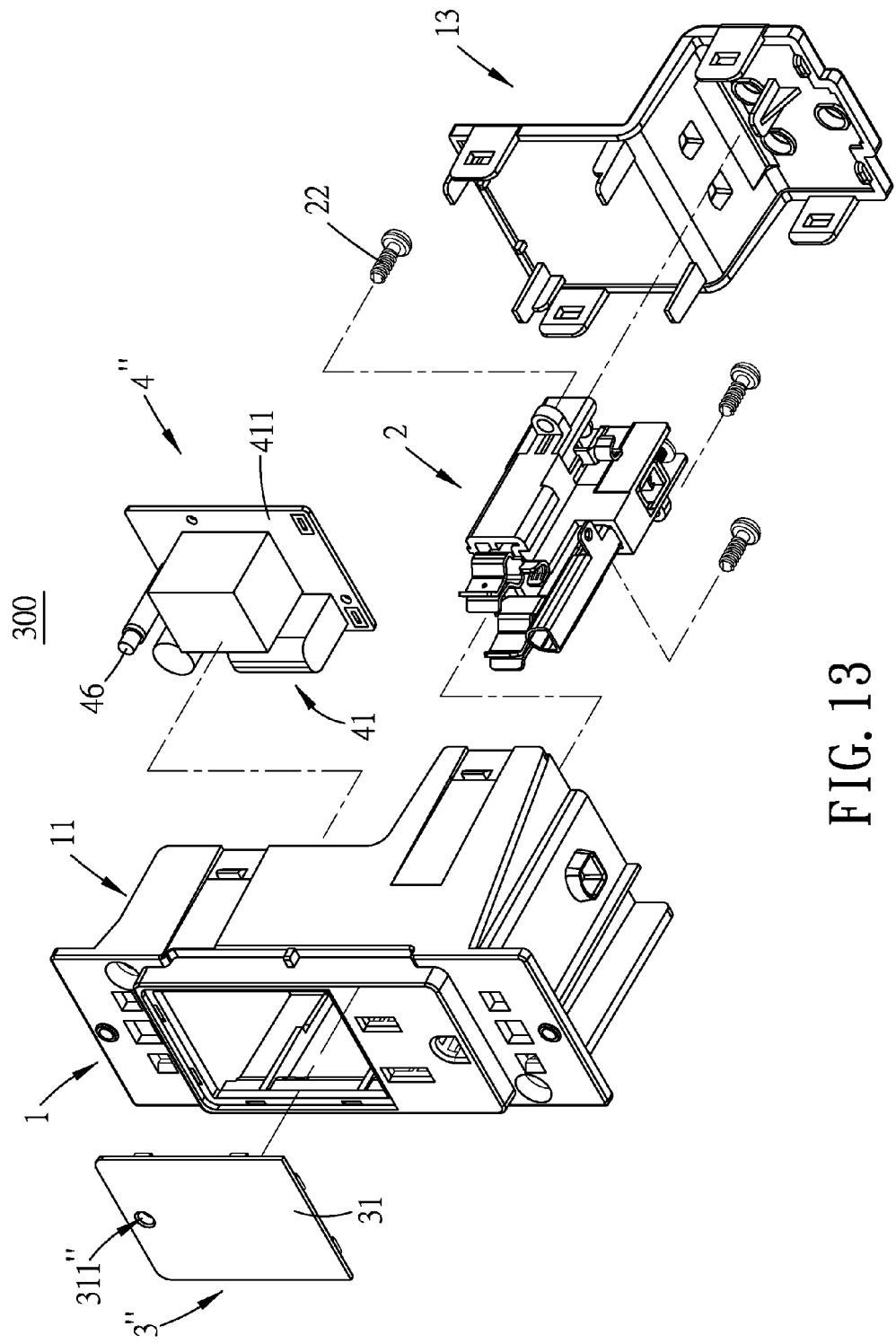
FIG. 13 is an exploded perspective view of the third embodiment.

FIGS. 12 and 13 illustrate a power outlet 300 according to a third embodiment of the present disclosure, which has a structure generally similar to that of the first embodiment. However, in this embodiment, the opening 311" the panel body 31 of the panel 3" is smaller than that of the first embodiment, and the electric component 4 includes the circuit module 41, and a light sensor 46 electrically connected to the circuit board 411 of the circuit module 41. The light sensor 46 extends into the opening 311" so as to be exposed from the panel 3". The light sensor 46 is used for detecting the ambient light, and can generate a corresponding detection signal based on the brightness change of the light. The detection signal generated by the light sensor 46 is transmitted to the circuit module 41. According to the received detection signal, the circuit module 41 can switch between the OFF and ON states.

Figure 14:
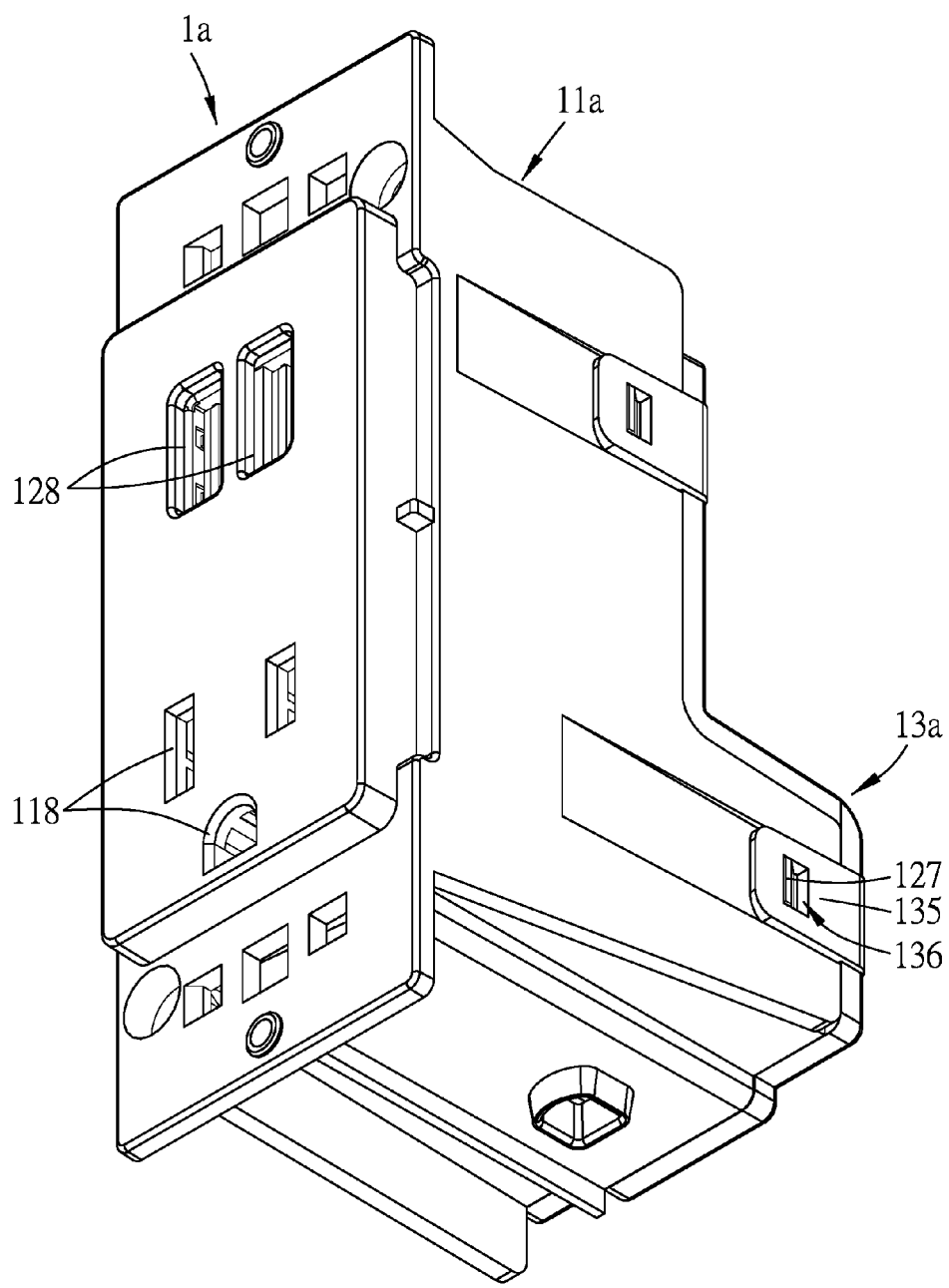
FIG. 14 is a perspective view of a power outlet according to a fourth embodiment of the present disclosure.
Figure 15:
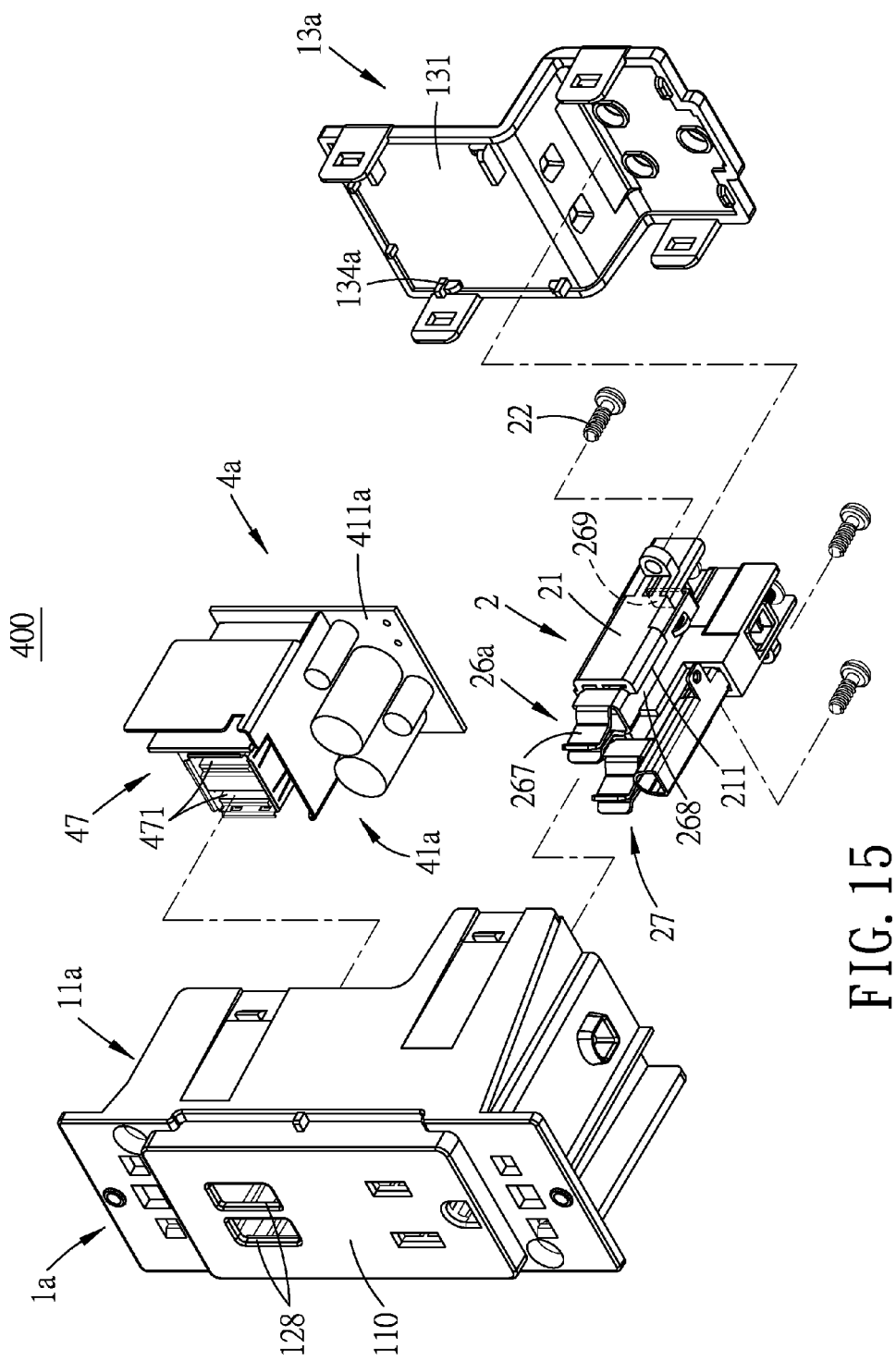
FIG. 15 is an exploded perspective view of the fourth embodiment.

FIGS. 14 and 15 illustrate a power outlet 400 according to a fourth embodiment of the present disclosure, which has a structure generally similar to that of the first embodiment. However, the difference between the first and fourth embodiments resides in the structures of the housing (1a), the first conductive terminal (26a) of the adapter member 2, and the electric component (4a). Further, the panel 3 (see FIG. 1) is omitted herein.

In this embodiment, each of the first and second housing bodies (11a, 13a) of the housing (1a) has a size greater than that of each of the first and second housing bodies 11, 13 of the housing 1 of the first embodiment. The front wall 110 of the first housing body (11a) further includes two connection ports 128 spaced apart from each other in the left-right direction and disposed above the insertion holes 118. Each supporting protrusion (134a) of the second housing body (13a) has a length smaller than that of each supporting protrusion 134 of the second housing 13 of the first embodiment. The first conductive terminal (26a) has a shape and a size identical to those of the second conductive terminal 27. The first conductive terminal (26a) includes a terminal body 267, an extension plate 268 extending rearwardly and transversely from a bottom end of the terminal body 267, and an abutment plate 269 extending upwardly from a rear end of the extension plate 268. The extension plate 268 is movably inserted into the first guide groove 211 of the adapter member 2.

The electric component (4a) has dimensions greater than that of the electric component 4 of the first embodiment. The electric component (4a) includes a circuit module (41a) and an electrical connector 47. The circuit module (41a) includes a circuit board (411a). The electrical connector 47 is a universal serial bus (USB) electrical connector that is electrically connected to the circuit board (411a) and that has two insertion grooves 471 respectively corresponding in position to the connection ports 128. An electronic product can be charged by inserting a USB power wire through one of the connection ports 128 to engage with a respective one of the insertion grooves 471.

Figure 16:
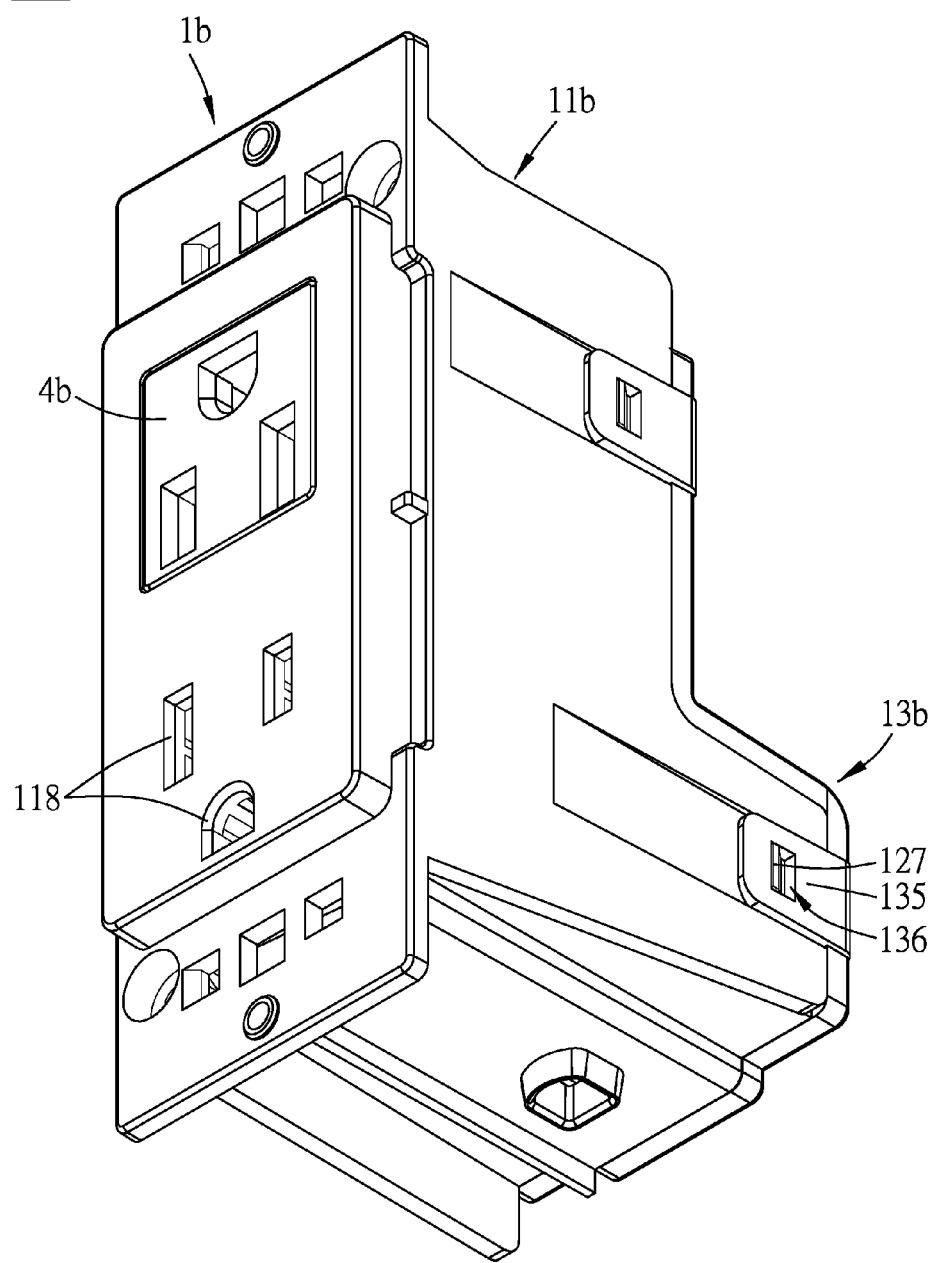
FIG. 16 is a perspective view of a power outlet according to a fifth embodiment of the present disclosure.
Figure 17:
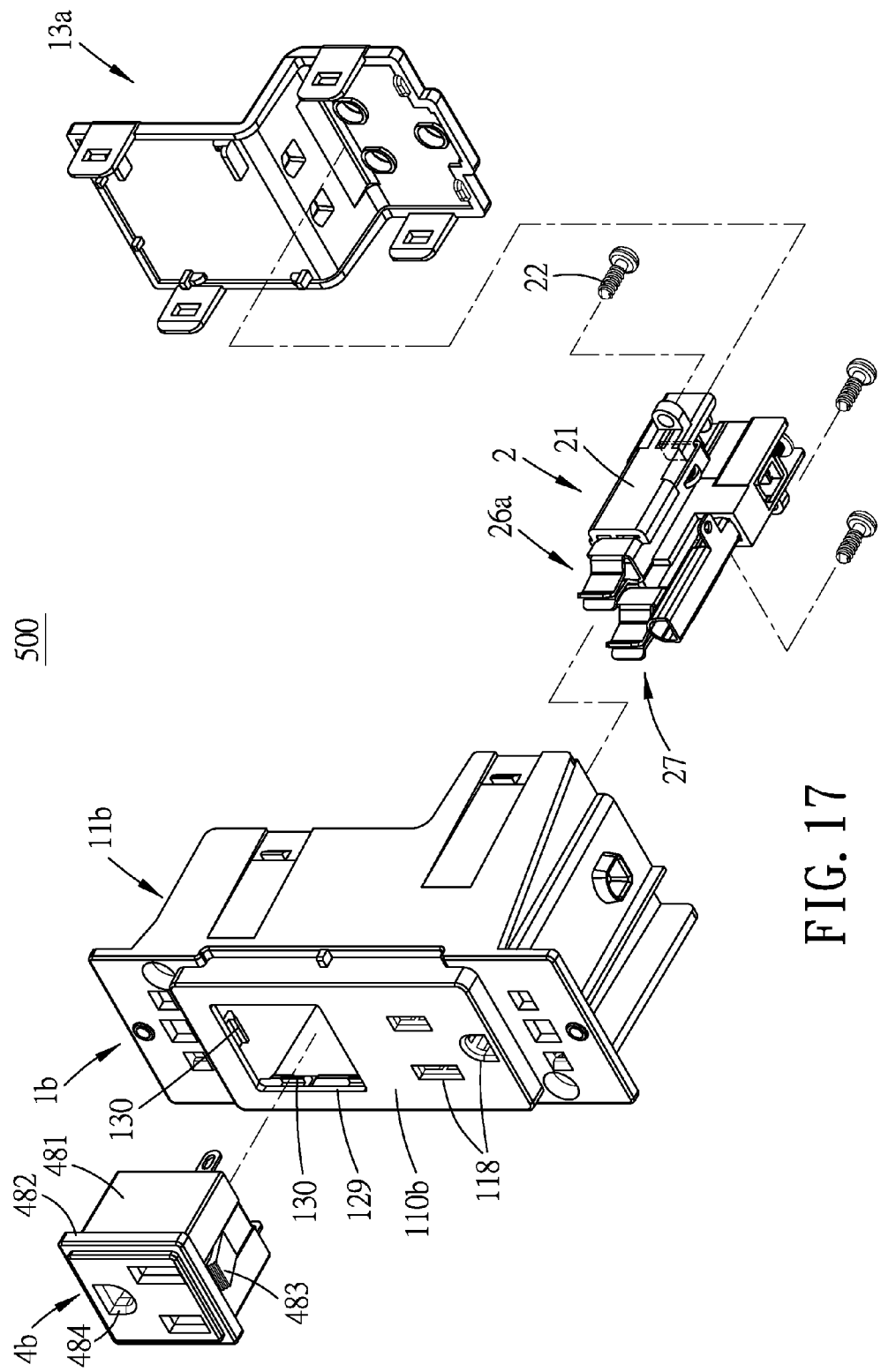
FIG. 17 is an exploded perspective view of the fifth embodiment.
Figure 18:
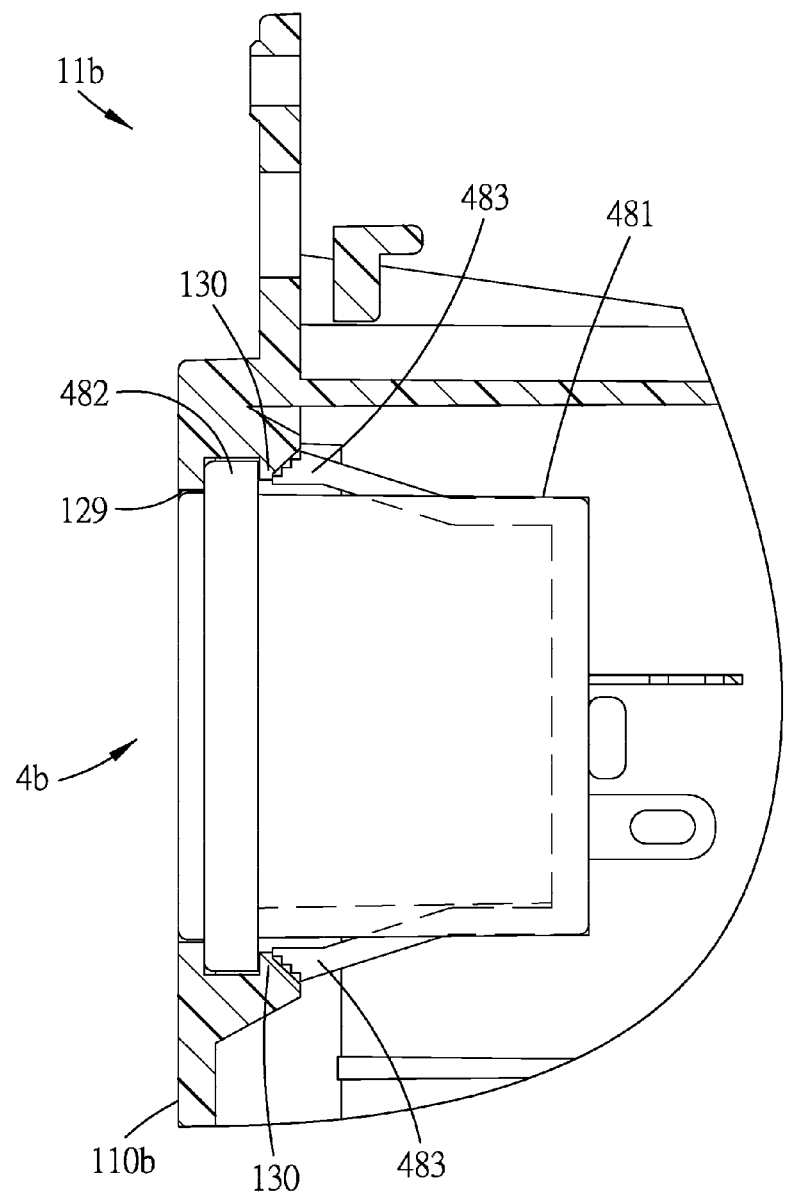
FIG. 18 is a fragmentary enlarged sectional view of the fifth embodiment, illustrating the assembly relationship of an electric component and a first housing body of the fifth embodiment.

FIGS. 16 to 18 illustrate a power outlet 500 according to a fifth embodiment of the present disclosure, which has a structure generally similar to that of the fourth embodiment. However, the difference between the fourth and fifth embodiments resides in the structures of the housing (1b) and the electric component (4b). Further, the panel 3 (see FIG. 1) is omitted herein.

In this embodiment, the front wall (110b) of the first housing body (11b) of the housing (1b) further includes an insertion port 129 disposed above the insertion holes 118, and a plurality of engaging hooks 130 protruding from a rear surface of the front wall (110b). Two of the engaging hooks 130 are located adjacent to top and bottom sides of the insertion port 129. The other remaining engaging hooks 130 are located adjacent to left and right sides of the insertion port 129. The electric component (4b) is a three-hole socket that includes a socket body 481, an annular flange portion 482 and two resilient arms 483. The socket body 481 is formed with three prong-receiving openings 484. The annular flange portion 482 protrudes outwardly from a periphery of the socket body 481 and adjacent to a front end of the socket body 481. The resilient arms 483 project respectively and outwardly from top and bottom sides of the socket body 481. When the electric component (4b) is inserted into the insertion port 129, the engaging hooks 130 engage a rear side of the annular flange portion 482 to prevent rearward movement of the electric component (4b), and the resilient arms 483 abut against the corresponding engaging hooks 130 to prevent forward movement of the electric component (4b). Through this, the electric component (4b) can be firmly connected to the first housing body (11b).

Figure 19:
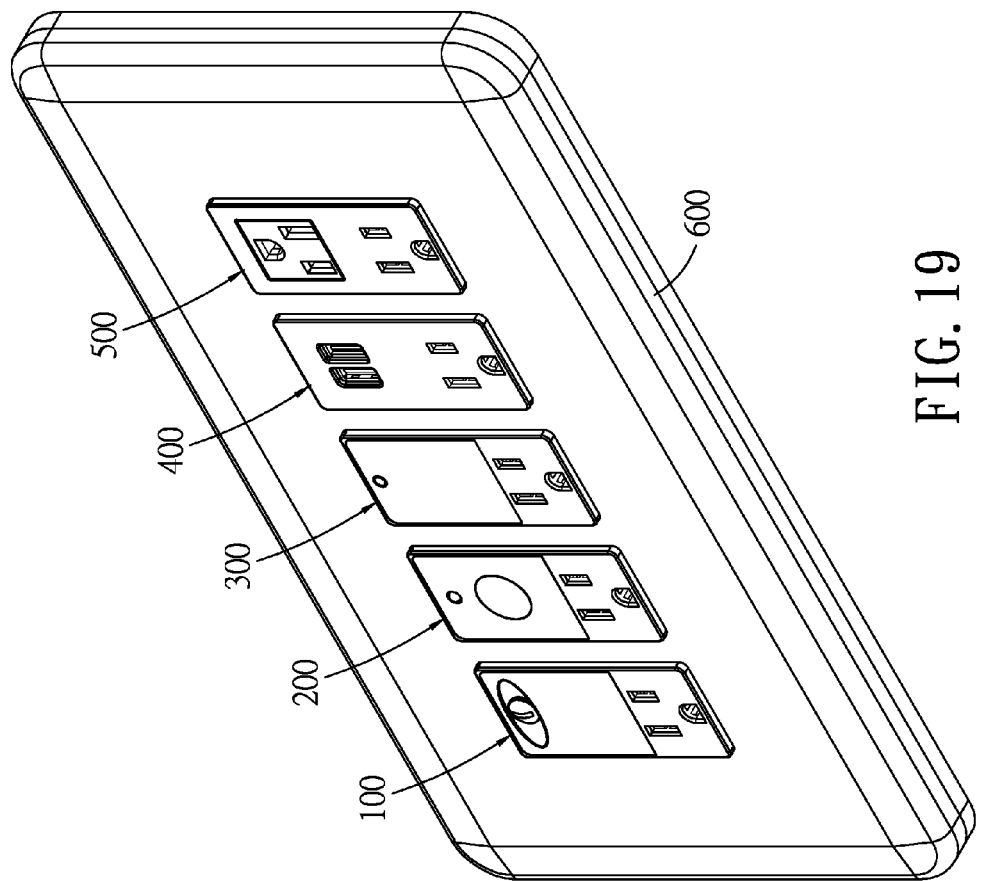
FIG. 19 is a perspective view of a power outlet assembly according to the present disclosure.

Referring to FIG. 19, a power outlet assembly according to the present disclosure includes a mounting plate 600 for mounting on a wall (not shown), and the power outlets 100 to 500 of the aforesaid five embodiments mounted on the mounting plate 600. Because the adapter members 2 of the power outlets 100 to 500 have the same function, the insulating bodies 21 of the adapter members 2 can serve as a universal component. As such, the insulating bodies 21 of the power outlets 100 to 500 have identical shape and size. Through this, only a single forming mold is made for the insulating body 21 which can be commonly used by the five power outlets 100 to 500.

Because the electric components 4, 4', 4" of the power outlets 100 to 300 have the same dimensions, the first and second housing bodies 11, 13 of the housing 1 can serve as a universal component, so that the first and second housing bodies 11, 13 of the power outlets 100 to 300 have identical shape and size. Through this, only a single forming mold is made for each of the first and second housing bodies 11, 13 which can be commonly used by the power outlets 100 to 300. As such, the manufacturing costs and the number of the forming molds can be reduced.

The structures of the panels 3, 3', 3" of the power outlets 100 to 300 slightly differ from each other, so that three different forming molds are made for the panels 3, 3', 3" of the power outlets 100 to 300. Further, because the panels 3, 3', 3" are small in size and simple in structure, and with them serving as alternative components, the design complexities of the forming molds can be simplified, so that, the forming molds for the panels 3, 3', 3" can be easily made, thereby reducing the manufacturing costs thereof.

Moreover, because the electric component (4a) of the power outlet 400 has larger dimensions than those of the power outlets 100 to 300, the first and second housing bodies (11a, 13a) of the power outlet 400 must be enlarged to receive the electric component (4a). Hence, the forming molds for the first and second housing bodies (11a, 13a) of the power outlet 400 must be separately made.

On the other hand, because the structure of the first housing body (11b) of the power outlet 500 slightly differs from that of the first housing body (11a) of the power outlet 400, there is a need to make a forming mold for the first housing body (11b) of the power outlet 500. In addition, because the electric component (4b) of the power outlet 500 is smaller than the electric component (4a) of the power outlet 400, and is directly engaged to the first housing body (11b) without the need for support by the supporting protrusions (134a) of the second housing body (13a), the second housing body (13a) of the power outlet 400 can serve as a universal component for the power outlets 400, 500.

Because the electric component 4, 4', 4", 4a, 4b of each of the power outlets 100 to 500 has the length in the front-rear direction smaller than that of each adapter member 2, each of the side walls 113 of the first housing body 11, 11a, 11b can be designed as L-shaped, thereby reducing the size of each first housing body 11, 11a, 11b and the manufacturing costs thereof.

Through the aforesaid description, the power outlets 100 to 500 of the power outlet assembly of the disclosure need to make a total of nine forming molds for the plastic structural components thereof. Of course, if the number of the power outlets of the power outlet assembly varies, the number of the forming molds also varies. For example, if the power outlet assembly includes the power outlets 100 and 200, the number of the forming molds for the insulating body 21, the first and second housing bodies 11, 13, and the panels 3, 3' is five. If the power outlet assembly includes the power outlets 400 and 500, separate forming molds are made for the insulating body 21, the first housing body (11a, 11b) and the second housing body (13a), so that a total of four forming molds are made in this case.

To sum up, by virtue of cooperation among the limiting frames 23, 23', 23", the abutment members 265, 273, 283 of the first to third conductive terminals 26, 27, 28, and the fasteners 25, the core wire portions 91 of the electrical wires 9 can be firmly and tightly clamped to prevent removal or bad connection of the core wire portions 91 from or with the respective limiting frame 23, 23', 23", thereby enhancing safety and reliability in use and stable electrical conductivity between each core wire portion 91 and the respective abutment plate 265, 273, 283. Further, because the power outlets 100 to 500 of the power outlet assembly have identical shape and size of the plastic components, the costs of making, producing and managing the forming molds can be saved.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment. Various features, aspects, and exemplary embodiments have been described herein. The features, aspects, and exemplary embodiments are susceptible to combination with one another as well as to variation and modification, as will be understood by those having skill in the art.

This disclosure is not limited to the disclosed exemplary embodiments but is intended to cover various arrangements included within the spirit and scope of the broadest interpretation so as to encompass all such modifications and equivalent arrangements.

What is claimed is:

1. A power outlet for electrical connection with a plurality of electrical wires each having a core wire portion, said power outlet comprising:
a housing having a receiving space, a plurality of insertion holes communicating with said receiving space, and a plurality of through holes communicating with said receiving space, each of said through holes being configured for insertion of a respective one of the electrical wires therethrough; and
an adapter member including
an insulating body disposed in said receiving space,
a plurality of limiting frames disposed on said insulating body, each of said limiting frames including a first side wall, and a second side wall oppositely spaced apart from said first side wall,
a plurality of conductive terminals movably connected to said insulating body and respectively corresponding with said insertion holes, each of said conductive terminals including an abutment plate inserted into a respective one of said limiting frames, said abutment plate of each of said conductive terminals and said first side wall of the respective one of said limiting frames being spaced apart from each other for accommodating therebetween the core wire portion of the respective one of the electrical wires, and
a plurality of fasteners respectively and movably connected to said second side walls of said limiting frames, each of said fasteners being operable to extend through said second side wall of the respective one of said limiting frames to push said abutment plate of a respective one of said conductive terminals to move toward said first side wall of the respective one of said limiting frames for tightly clamping the core wire portion of the respective one of the electrical wires between said first side wall and said abutment plate.

2. The power outlet as claimed in claim 1, wherein each of said limiting frames further includes a third side wall connecting one end of said first side wall to one end of said second side wall, and a fourth side wall connecting the other end of said first side wall to the other end of said second side wall and spaced apart from said third side wall, said first to fourth side walls cooperatively defining an accommodating space for accommodating said abutment plate of the respective one of said conductive terminals and the core wire portion of the respective one of the electrical wires.

3. The power outlet as claimed in claim 2, wherein said second side wall of each of said limiting frames is formed with a first threaded hole, each of said fasteners being a screw threadedly connected to said first threaded hole of said second side wall of the respective one of said limiting frames and abutting against said abutment plate of the respective one of said conductive terminals.

4. The power outlet as claimed in claim 3, wherein:
said third side wall is formed with an engaging groove; and
said second side wall includes an outer wall body bent from an end of said fourth side wall toward said third side wall, and an engaging arm bent from an end of said outer wall body opposite to said fourth side wall and engaged with said engaging groove (238).

5. The power outlet as claimed in claim 4, wherein said fourth side wall has an engaging groove adjacent to said outer wall body, said second side wall further including an inner wall body bent from an end of said third side wall toward said fourth side wall and abutting against said outer wall body, said first threaded hole extending through said inner and outer wall bodies, said inner wall body having an engaging tab engaged with said engaging groove.

6. The power outlet as claimed in claim 1, wherein said housing includes a first housing body and a second housing body connected to and cooperating with said first housing body to define said receiving space, said first housing body having said insertion holes, said through holes being formed in said first and second housing bodies, said power outlet further comprising an electric component received in said receiving space.

7. The power outlet as claimed in claim 6, wherein said first housing body includes a front wall, and two side walls extending rearwardly and transversely from said front wall and spaced apart from each other in a left-right direction, each of said side walls having a substantially L-shaped form, and including a first wall portion extending rearwardly from said front wall, and a second wall portion extending rearwardly from said front wall and connected to a bottom end of said first wall portion, said second wall portion having a length greater than that of said first wall portion in the rearward direction, said adapter member being disposed between said second wall portions of said side walls of said first housing body, said electric component having a length smaller than that of said adapter member in a front-rear direction, and being located between said first wall portions of said side walls of said first housing body.

8. The power outlet as claimed in claim 6, wherein said first housing body further includes a mounting groove formed in said front wall, said power outlet further comprising a panel disposed in and engaged with said mounting groove and corresponding in position to said electric component, said electric component being an electronic switch switchable between an ON state and an OFF state.

9. The power outlet as claimed in claim 8, wherein said panel is formed with an opening, and said electric component includes a pyroelectric passive infrared sensor extending into said opening in said panel.

10. The power outlet as claimed in claim 8, wherein said panel is formed with a touch region, and said electric component includes a touch sensing module corresponding to said touch region, and a wireless communication module.

11. The power outlet as claimed in claim 8, wherein said panel is formed with an opening, and said electric component includes a light sensor extending into said opening in said panel.

12. The power outlet as claimed in claim 6, wherein said first housing body further includes a connection port, and said electric component includes an electrical connector having an insertion groove corresponding in position to said connection port.

13. The power outlet as claimed in claim 6, wherein said first housing body further includes an insertion port, and said electric component is a socket inserted into said insertion port and engaged to said first housing body.

14. A power outlet assembly comprising:
a mounting plate for mounting on a wall; and
at least two different types of power outlets mounted on said mounting plate, each of said power outlets being configured to electrically connect with a plurality of electrical wires each having a core wire portion, each of said power outlets including
a housing having a receiving space, a plurality of insertion holes communicating with said receiving space, and a plurality of through holes communicating with said receiving space, each of said through holes being configured for insertion of a respective one of the electrical wires therethrough, and
an adapter member including an insulating body, a plurality of limiting frames disposed on said insulating body, a plurality of conductive terminals movably connected to said insulating body and respectively corresponding with said insertion holes, and a plurality of fasteners, each of said limiting frames including a first side wall, and a second side wall oppositely spaced apart from said first side wall, each of said conductive terminals including an abutment plate inserted into a respective one of said limiting frames, said abutment plate of each of said conductive terminals and said first side wall of the respective one of said limiting frames being spaced apart from each other for accommodating therebetween the core wire portion of the respective one of the electrical wires, said fasteners being respectively and movably connected to said second side walls of said limiting frames, each of said fasteners being operable to extend through said second side wall of a respective one of said limiting frames to push said abutment plate of a respective one of said conductive terminals to move toward said first side wall of the respective one of said limiting frames for tightly clamping the core wire portion of the respective one of the electrical wires between said first side wall and said abutment plate;
said insulating bodies of said adapter members of said at least two different types of power outlets having identical shape and size.

15. The power outlet assembly as claimed in claim 14, wherein each of said limiting frames further includes a third side wall connecting one end of said first side wall to one end of said second side wall, and a fourth side wall connecting the other end of said first side wall to the other end of said second side wall and spaced apart from said third side wall, said first to fourth side walls cooperatively defining an accommodating space for accommodating said abutment plate of the respective one of said conductive terminals and the core wire portion of the respective one of the electrical wires.

16. The power outlet assembly as claimed in claim 14, wherein said second side wall of each of said limiting frames is formed with a first threaded hole, each of said fasteners being a screw threadedly connected to said first threaded hole and abutting against said abutment plate of the respective one of said conductive terminals.

17. The power outlet assembly as claimed in claim 14, wherein said housing of each of said power outlets further has a first housing body and a second housing body connected to and cooperating with said first housing body to define said receiving space, said first housing body having said insertion holes, said through holes being formed in said first and second housing bodies, each of said power outlets further including an electric component received in said receiving space.

18. The power outlet assembly as claimed in claim 17, wherein said electric component of each of said power outlets is an electronic switch switchable between an ON state and a OFF state, said electric components of said power outlets having substantially the same size but having different structures, said first and second housing bodies of said power outlets having identical shape and size.

19. The power outlet assembly as claimed in claim 18, wherein said first housing body of each of said power outlets further includes a mounting groove communicating with said receiving space, each of said power outlets further including a panel disposed in and engaged with said mounting groove and corresponding in position to said electric component, said panels of said power outlets having different structures.

20. The power outlet assembly as claimed in claim 17, wherein said electric components of said power outlets have different structures and sizes, said first housing bodies of said power outlets have different shapes and sizes, and said second housing bodies of said power outlets have identical shape and size.

\* \* \* \* \*